United States Patent [19]

Riza

[11] Patent Number: 5,694,216

[45] Date of Patent: Dec. 2, 1997

[54] SCANNING HETERODYNE ACOUSTO-OPTICAL INTERFEROMETERS

[75] Inventor: Nabeel A. Riza, Orlando, Fla.

[73] Assignee: University of Central Florida, Orlando, Fla.

[21] Appl. No.: 636,506

[22] Filed: Apr. 25, 1996

[51] Int. Cl.$^6$ .................................................. G01B 9/02
[52] U.S. Cl. ........................... 356/349; 356/345; 356/351
[58] Field of Search ................................... 356/345, 351, 356/349

[56] References Cited

U.S. PATENT DOCUMENTS

| | | |
|---|---|---|
| 4,297,704 | 10/1981 | Marom et al. . |
| 4,466,738 | 8/1984 | Huang et al. . |
| 4,627,730 | 12/1986 | Jungerman et al. . |
| 5,116,126 | 5/1992 | Wang et al. . |
| 5,139,336 | 8/1992 | See . |
| 5,369,489 | 11/1994 | Somekh . |
| 5,453,835 | 9/1995 | Ward et al. ........................ 356/345 |
| 5,479,259 | 12/1995 | Nakata et al. . |
| 5,481,360 | 1/1996 | Fujita . |
| 5,485,272 | 1/1996 | Dirksen et al. . |

OTHER PUBLICATIONS

N.A. Riza, "High Speed Wide Bandwidth Optical Encryption and Decryption System using Spatial Codes," 8th Annual IEEE LEOS Meeting, Paper OC7.4, San Francisco, CA, Nov. 2, 1995.

N.A. Riza, "An Acoustooptic Phased Array Antenna Beamformer with Independent Phase and Carrier Control Using Single Sideband Signals," *IEEE Photonics Technology Letters*, vol. 4, No. 2, Feb. 1992, cover page, pp. 177–179.

N.A. Riza, "A Compact High–Performance Optical Control System for Phased Array Radars," *IEEE Photonics Technology Letters*, vol. 4, No. 9, Sep. 1992, cover page, pp. 1072–1075.

N.A. Riza, "Liquid Crystal–Based Optical Control of Phased Array Antennas," *Journal of Lightwave Technology*, vol. 10, No. 12, Dec. 1992, pp. 1974–1984.

(List continued on next page.)

*Primary Examiner*—Frank G. Font
*Assistant Examiner*—Robert Kim
*Attorney, Agent, or Firm*—Burns, Doane, Swecker & Mathis, L.L.P.

[57] ABSTRACT

Compact, high performance, scanning heterodyne optical interferometers for interferometric phase-based measurement and a host of other applications are introduced. An in-line, almost common-path optical interferometer design offers robustness to externally induced phase noise via mechanical vibrations, thermal effects, and other environmental effects. Several instrument designs are disclosed for both transmissive and reflective interferometry. These interferometers use acousto-optic devices or Bragg cells to implement rapid (e.g., <50 μs/scan spot) optical scanning of a test medium. Although the read optical beam scans a given test region, the double Bragg diffraction optical design of the instrument makes the final interfering output beams stationary on the two high speed photo-detectors used for radio frequency signal generation via heterodyne detection. One photo detector acts as the fixed phase reference, while another fixed photo detector picks up the test medium phase information as the optical beam scans the test region. High speed two dimensional optical scanning of a test medium is possible by using a fixed one dimensional output high speed detector array, or via the use of high speed non-mechanical electro-optic deflectors. Also, the invention can be embodied in a coherent wide bandwidth optical transmitter using fast optical scanning of spatial codes for encrypted coherently coded coherent optical fiber transmission. This coherent system for complex optical code reading and transmission is reversible in nature, and can be used for both transmit-receive coded coherent optical communications.

28 Claims, 12 Drawing Sheets

OTHER PUBLICATIONS

N.A. Riza, "Acousto–optic liquid–crystal analog beam former for phased–array antennas," *Applied Optics*, vol. 33, No. 17, Jun. 10, 1994, pp. 3712–3724.

N.A. Riza, "In–line interferometric time–integrating acousto–optic correlator," *Applied Optics*, vol. 33, No. 14, May 10, 1994, pp. 3060–3069.

N.A. Riza, "Space Integrating Interferometric Acousto–Optic Convolver," *IEEE Photonics Technology Letters*, vol. 7, No. 3, Mar. 1995, pp. 339–341.

N.A. Riza, "Novel Space/Time Integrating Acoustooptic Architectures for Radar Signal Processing," *SPIE*, vol. 2155, pp. 413–419.

N.A. Riza, "Acousto–optic architecture for two–dimensional beam scanning in phased–array antennas," *Applied Optics*, vol. 31, No. 17, Jun. 10, 1992, cover page, pp. 3278–3284.

N.A. Riza et al., "Three–terminal adaptive nematic liquid–crystal lens device," *Optics Letters*, vol. 19, No. 14, Jul. 15, 1994, pp. 1013–1015.

M.S. Valera et al., "A high performance magnetic force microscope," *Measurement Sci. Tech.*, vol. 7, Jan. 1996, pp. 30–35.

R.G. Johnston et al., "Refractive index detector using Zeeman interferometry," *Applied Optics*, vol. 29, No. 31, Nov. 1, 1990, pp. 4720–4724.

N.A. Riza, "Optically efficient interferometric acousto–optic architecture for spectrum analysis," *Applied Optics*, vol. 31, No. 17, Jun. 10, 1992, pp. 3194–3196.

M. Sasaki et al., "Improved differential heterodyne interferometer for atomic force microscopy," *Rev. Sci. Instrum.*, vol. 65, No. 12, Dec. 1994, pp. 3697–3701.

M.J. Cunningham et al., "A differential interferometer for scanning force microscopy," *Meas. Sci. Technol.* vol. 5, 1994, pp. 1350–1354.

R. Crane, "Interference Phase Measurement," *Applied Optics*, vol. 8, No. 3, Mar. 1969, pp. 538–542.

C. Schonenberger et al., "A differential interferometer for force microscopy," *Rev. Sci. Instrum.*, vol. 60, No. 10, Oct. 1989, pp. 3131–3134.

Ruedi Thalmann et al., "Strain measurement by heterodyne holographic interferometry," *Applied Optics*, vol. 26, No. 10, May 15, 1987, pp. 1964–1971.

J. Mastner et al., "Electronic instrumentation for heterodyne holographic interferometry," *Rev. Sci. Instrum.*, vol. 51, No. 7, Jul. 1980, pp. 926–931.

S.F. Jacobs et al., "Thermal expansion uniformity of materials for large telescope mirrors," *Applied Optics*, vol. 23, No. 23, Dec. 1, 1984, pp. 4237–4244.

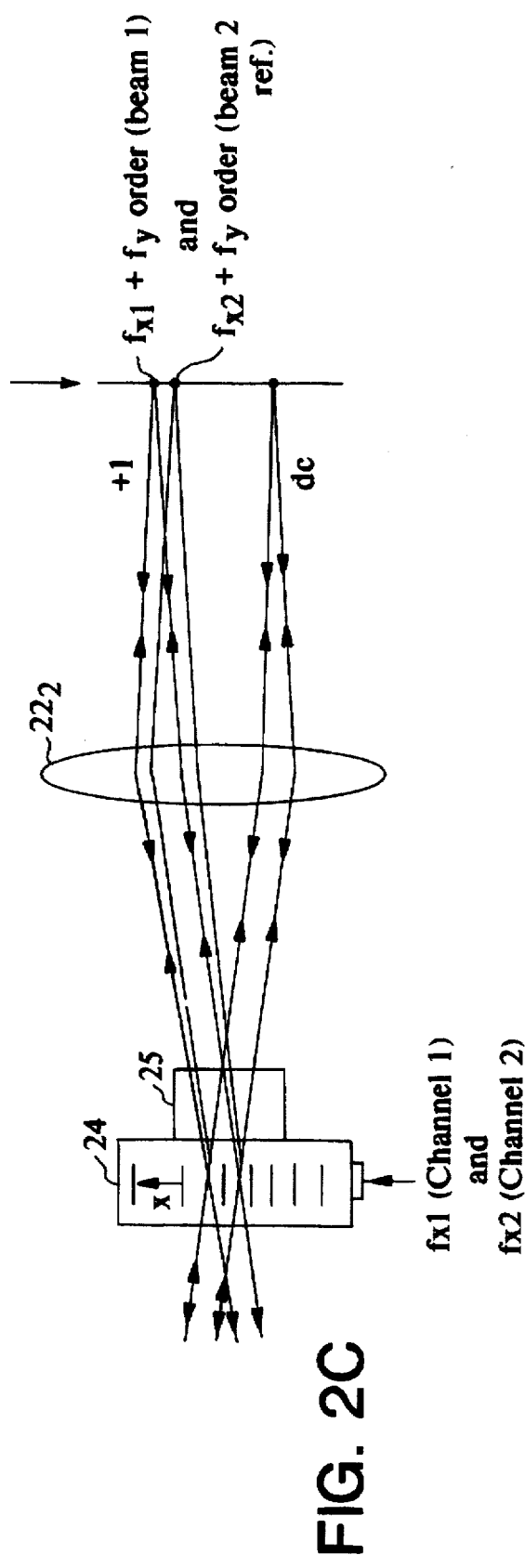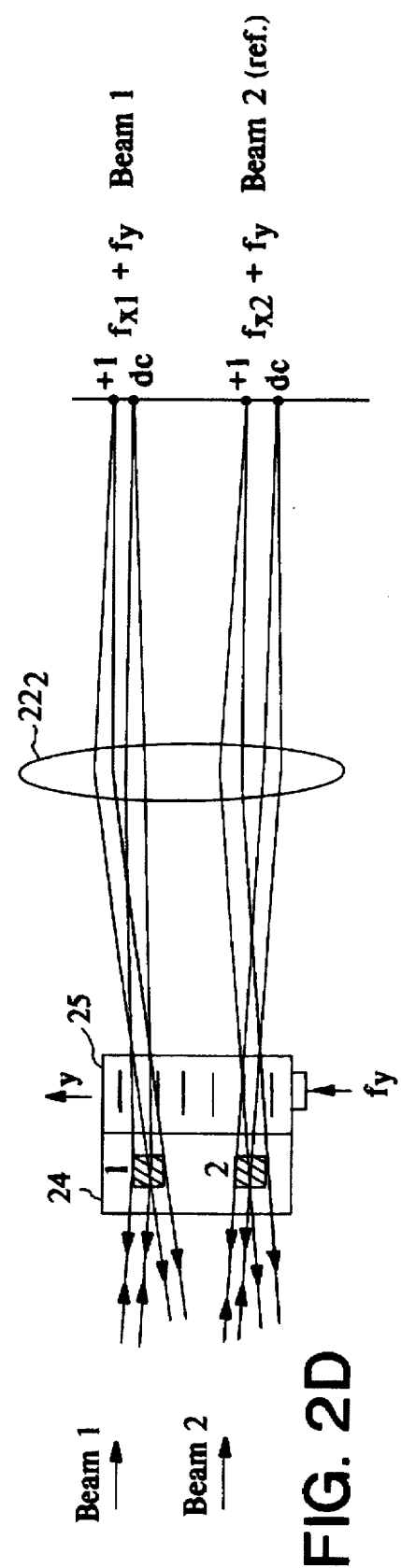

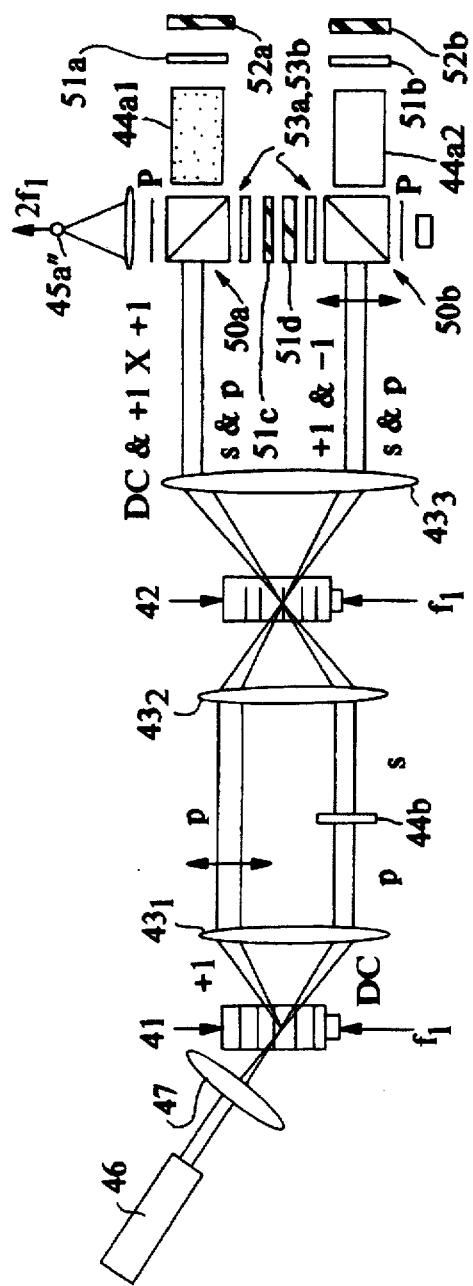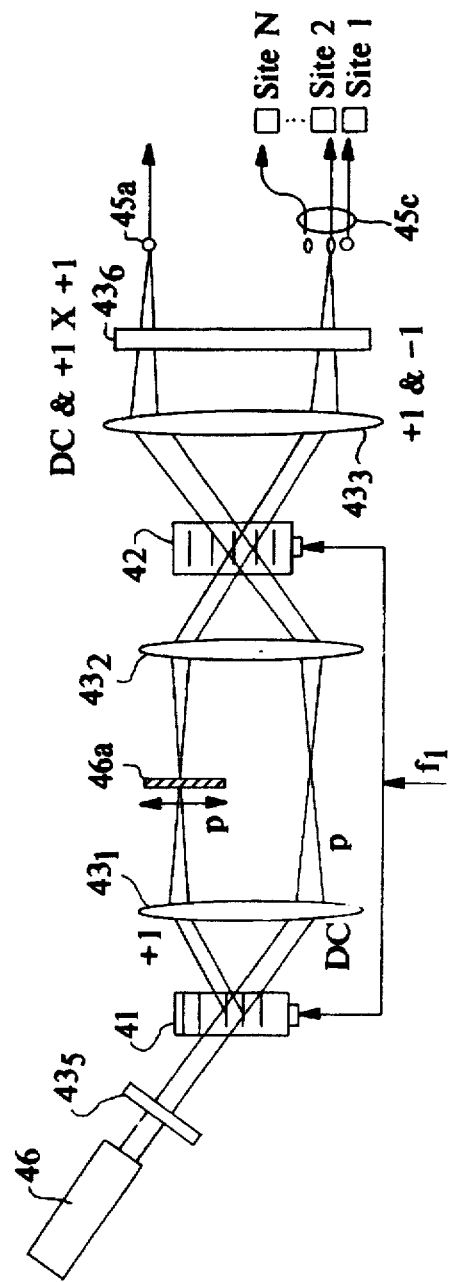

SCANNING HETERODYNE ACOUSTO-OPTICAL INTERFEROMETERS

BACKGROUND OF THE INVENTION

1. Field of the Invention

The present invention relates to a measuring and testing method and device using light interference and, in particular, light interference by light beams of different frequencies, i.e., heterodyne detection techniques.

2. Discussion of Related Art

Measurement and Testing Interferometry

It is well known that optical interferometry plays a vital and useful role in scientific and industrial applications. Over the years, optical interferometry has been used for a wide variety of applications that include measurements of material thickness and changes in thickness, biomedical uses such as real-time DNA detection, surface structure characterization, gas flow and plasma temperature measurement, particle velocity measurement, electric and magnetic field sensing, rotation and stress measurements, magnetic force microscopes, optical scanning microscopes for non-destructive testing of integrated electronic and optical circuits, optical tweezers for micromanipulation, and a host of other applications, such as disclosed in, e.g., P. Hariharan, *Handbook of Optics*, Vol. II, 2nd Edition, M. Bass Editor in Chief, McGraw Hill, New York, Ch. 21, Section 21.1 to 21.25, 1995, and *Springer Series in Optical Sciences*, P. K. Rastogi, Editor, 68, pp. 1–6, Springer-Verlag, New York (1994).

One basic phase measurement method is called the quasi-heterodyne phase-step method where the local intensity of the interference pattern is sampled at fixed phase steps, such as disclosed in J. Schwider, *Progress in Optics*, North Holland, Amsterdam, 28, 273 (1980). This method allows only modulo-2 $\pi$ interference measurements and, to get a complete phase map, the continuity of the phase function must be assumed. Further, well known phase interpolation techniques, such as disclosed in K. Creath, *Springer Series in Optical Sciences*, 68, 5, P. K. Rastogi, Editor, pp. 109–148, Springer-Verlag, New York (1994), must be used. This method typically offers as measurement accuracy one (1) percent of a fringe interference phase measurement accuracy.

An interferometer that offers higher accuracy, i.e., better than 1/1000 of a fringe interference phase measurement, and also avoids both the phase interpolation problem (associated with the quasi-heterodyne methods) and the sign ambiguity of classical interferometry, is the heterodyne interferometer, such as discussed in J. Schwider, *Progress in Optics*, North Holland, Amsterdam, 28, 273 (1980); J. H. Bruning et at., *Applied Optics*, 13, 2693 (1974); and R. Dändliker, *Progress in Optics*, North Holland, Amsterdam, 17, 1 (1980).

In this interferometer, a high speed photo-detector generates an electrical signal via heterodyne detection of the interfering signal and reference optical beams that have slightly different (e.g., by 1 MHz) optical frequencies. The phase of this heterodyne detected electrical signal relative to a stable, external electrical signal determines the measured local optical phase of the test medium by an electronic phase meter which is typically used to measure the phase difference between the two electrical signals, such as disclosed in Mastner, V. Masek, *Rev. Sci. Instrum.*, Vol. 51, (1980) p. 926. Using this localized phase information and mechanically scanning the test medium by the mechanical motion of a detector, the overall phase distribution of the test medium can be reconstructed for test and evaluation purposes.

One such use of the heterodyne interference method was implemented for strain measurements via a two reference beam, holographic interferometric set-up, as disclosed in R. Dändliker, B. Eliasson, *Exp. Mech.*, 19, 93 (1979); and R. Thalmann and R. Dändliker, *Applied Optics*, 26, 1964 (1987). Here, a frequency difference of 100 KHz between the two reference beams during the reconstruction process was generated using two acousto-optic modulators (AOMs) set for opposite Doppler shifts, with one AOM driven by 40 MHz and the other by 40.1 MHz. The phase differences between the two 100 KHz beat signals generated at the output photo-detector pair are measured using a zero-crossing electronic phase-meter which interpolates the phase angle to 0.1° and also counts the multiples of 360°.

One important conclusion of this heterodyne experiment was that the heterodyne fringe interpolation technique did not restrict the phase measurement accuracy. In fact, it was mainly the air turbulence and mechanical hologram repositioning that limited instrument performance.

Another heterodyne interferometer measurement instrument was tested recently using phase-locked PZT-tunable diode-pumped ND:YAG lasers and acousto-optic (AO) devices, as disclosed in E. Gelmini, et al., *Rev. Sci. Instrum.*, 66, 8, 4073 (1995).

A common theme with nearly all heterodyne interferometers is the use of the Doppler shifting property of AO devices to generate the color shifts in the optical beams used in the interferometry. These AO device-based interferometers are constructed using several mirrors, beam splitters, beam combiners, and possibly a host of other optical and mechanical components laid out over a large test area (e.g., 1 $m^2$). Furthermore, mechanical motion of mirrors is typically used for scanning the optical beams used in the interference process for gathering phase data for a given test area.

Because each component of an interferometer is a possible source of unwanted phase noise (e.g., through mechanical vibration of a mirror), in general, these conventional heterodyne optical interferometers have to be built on costly air-isolation optical tables with special thermal and mechanical vibration protection. Even in systems that do not appreciably suffer from these problems, there is still a need for a high optical power, high speed scanning interferometer system providing accurate diagnostic measurements.

Signal Processing Interferometry

Two significant Bragg cell-based optical interferometers have been developed mainly for such optical signal processing applications. These are the Mach-Zehnder Acousto-Optic (AO) interferometer, and the in-line Koester prism AO interferometer, such as disclosed in A. Vander Lugt, "Interferometric Spectrum Analyzer," *Applied Optics*, Vol. 20, No. 16, (1981) pp. 2770–2779, and M.D. Koontz, "Miniature Interferometric Spectrum Analyzer," *Optical Information Processing II*, Proc. Soc. Photo-Opt. Instrum. Eng. 639, (1986) pp. 126–130. Although the in-line Koester prism design offers much improved mechanical and vibrational stability than the Mach-Zehnder AO design, there still remains key sources of optical phase instabilities due to the use of independent Koester prism components for the optical beam splitting and beam combining operations. Depending on the application requirements, one optical interferometer might be preferred over the other but both suffer from mechanical instabilities which influence phase measurements.

The Riza Interferometer for Signal Processing

Over the last several years, the present inventor has developed and experimentally demonstrated a compact, heterodyne and baseband-type, optical interferometer architecture for a host of photonic information processing applications such as phased array antenna/radar control (N. A. Riza, Ph.D Thesis, California Inst. of Tech., Pasadena, U.S.A., Oct., (1989); N. A. Riza, *IEEE Photonics Tech. Lett.*, Vol. 4, No. 2, 177–179 (Feb. 1992); N. A. Riza, *IEEE Photonics Tech. Lett.*, Vol. 4, No. 9, 1073–1075 (Sept. 1992); N. A. Riza, *IEEE/OSA J. of Lightwave Tech.*, Vol. 10, No. 12, 1974–1984 (Dec. 1992); and N. A. Riza, *Applied Optics*, Vol. 33, No. 17, 3712–3724 (June 1994)) and radio frequency (rf) signal correlation (N. A. Riza, *Applied Optics*, Vol. 33, No. 14, 3060–3069 (May 1994)), convolution (N. A. Riza, *IEEE Photonics Tech. Lett.*, Vol. 7, No. 3, 339–341 (March 1995)), notch filtering (N. A. Riza, *SPIE Proc.* 2155, 413–419 (1994)), and spectrum analysis operations (N. A. Riza, *Applied Optics*, Vol. 31, No. 17, 3194–3196 (June 1992)).

This basic interferometric architecture is shown in FIG. 1, and consists of two Acousto-Optic (AO) devices such as Bragg cells 11 and 12 in an in-line configuration, where the first Bragg cell 11 acts as an optical beam splitter and the second Bragg cell 12 acts as an optical beam combiner. Thus, using only four optical components (the two Bragg cells 11 and 12 and two spherical lenses $13_1$ and $13_2$) all in the path of the interfering optical beams, a compact, low component count interferometer 10 is realized. This heterodyne/baseband interferometer 10 has an important property that is desirable for all optical interferometers; namely, excellent mechanical stability and tolerance to optical phase instabilities via the almost common-path in-line design.

This interferometer 10 is collinear, except between the two Bragg cells where the two interfering beams are physically separated, although still in-line and in close proximity (e.g., within 1 cm). Thus, any thermal, mechanical, or air turbulence affects impinging on this instrument have almost the same affect on both interfering beams and therefore on an output photo detector 15, such as a high speed photo diode, CCD baseband sensor or other suitable form of photosensor. In fact, the heterodyne detection operation via optical mixing at the photo detector 15 results in the cancellation of this type of phase noise.

In operation, the interferometer 10 shown in FIG. 1 receives light from an input laser (not shown), which is Bragg matched to the first Bragg cell 11. The first Bragg cell 11 is controlled by a radio-frequency (rf) signal r(t) centered at a central frequency $f_c$ of the Bragg cell's operating range. For the low diffraction efficiencies (e.g., <10%) needed for optimal linear AO signal modulation, the first Bragg cell 11 produces a strong undiffracted DC (i.e., unmodulated) beam and a weaker, deflected, positive Doppler shifted, +1 order diffracted beam which has been frequency shifted by the input rf signal r(t). Thus, the first Bragg cell 11 creates the two beams used in this heterodyne interferometer 10.

Non-magnifying (1:1) imaging optics consisting of two spherical lenses $13_1$ and $13_2$ or their equivalent are used to image the first Bragg cell 11 onto an imaging plane of the second Bragg cell 12. The imaging optics preserve the Bragg matching condition at the second Bragg cell 12, the second Bragg cell 12 being fed by a rf signal s(t) centered at a central operating frequency $f_c$ of the second Bragg cell 12, which is the same as the first Bragg cell 11 in this example. The strong DC beam from the first Bragg cell 11 generates, at the second Bragg cell 12, a weaker, deflected, negative Doppler shifted, −1 order diffracted beam (or, optionally, positive −1 order diffracted beams, this option being shown in FIG. 1 by a reverse oriented Bragg cell 12' in phantom).

After the second Bragg cell 12, the diffracted +1 and diffracted −1 (or +1) order beams are collinear, meaning that the second Bragg cell 12 also acts as a beam combiner for the interferometer 10.

A third spherical lens $13_3$ collimates the output beams of the second Bragg cell 12 (or 12'). The strong DC beam from the second Bragg cell 12 (or 12') is not utilized in the signal processing and is blocked by a spatial block 17, while the collinear +1 and −1 (or +1) order beams are focused or imaged onto a high speed photo detector or detector array 15 by a fourth spherical lens $13_4$.

Depending on the desired information processing application, the output collinear +1 and −1 order beams (or +1 and +1 order beams) interfere with one another and are heterodyne detected by an appropriately positioned photo detector or detector array at a desired output plane and processed by a variety of known means. Also, as shown in FIG. 1, the two-beam interference can be optionally detected at either the Fourier plane of the second Bragg cell 12 (or 12') by the photo detector 15', or the image plane of the second Bragg cell 12 as shown in phantom by a photo detector 15". As an additional option, image inversion optics 19, such as a Dove prism, can be inserted between the first and second spherical lenses $13_1$ and $13_2$ along the +1 order diffracted beam of the first Bragg cell 11 for certain signal processing needs. As a further option, a baseband sensor such as a CCD 15" can be used in place of the photo detector 15 to detect a baseband signal.

The beat rf signal generated by the interference sensing photo detector 15 (or 15') is centered at a $2f_c$ frequency carrier for the +1, −1 order case, and is modulated by the required signal processing transform output signal desired from the photonic processor. In the optional case using the second Bragg cell 12' and the CCD 15", the +1, +1 orders interfere to generate the desired baseband output signal.

Because a Bragg cell is an excellent device for introducing rf or wideband (e.g., 50 Mhz to 1 GHz instantaneous bandwidth) electrical signals onto the Bragg diffracted optical beam, it becomes possible to use this interferometer to optically process a variety of electrical signals and, in particular, the electromagnetic interference (EMI) sensitive microwave or higher band electrical signals. Thus, the present inventor proposed and experimentally demonstrated several versions of this interferometer shown in FIG. 1 as various significant coherent signal processors as mentioned above. As can be seen from a review of the articles cited above, the Riza interferometer has been shown to be useful in a wide-variety of signal processing applications, as opposed to measuring and testing applications. It is important to note that the output of these Riza interferometers is either the −1 or +1 order diffracted beams or the +1 and +1 (or −1 and −1) diffracted order beam pairs, that interfere of the second Bragg cell's (12 or 12') Fourier or image plane. An important thing to note in the design is that the DC beam is not detected and therefore not used in the various signal processing applications.

As disclosed in R. G. Johnston and W. K. Grace, "Refractive index detector using Zeeman interferometry," *Applied Optics*, Vol. 29, pp. 4720–4724, 1990, and U.S. Pat. No. 4,906,095 to R. G. Johnston entitled "Apparatus and Method For Performing Two Frequency Interferometry", a heterodyne interferometer can also be formed using the Zeeman effect laser that emits two collinear laser lines with orthogonal polarizations. For example, the Helium Neon Zeeman effect laser by Optra, Peabody, Mass., emits two laser lines having a wavelength near λ=632.8 nm, and differ only in frequency by 250 KHz. Thus, the heterodyne detected signal generated by this interferometer is at a 250 KHz electrical signal. The key point to note about this heterodyne interferometer is that it is a non-scanning interferometer, i.e., the test optical beam does not electronically scan the sample material or test medium. Also, the heterodyne frequency is fixed by the type of laser used, and is not tunable. The next paragraph deals with scanning heterodyne interferometers.

Others have employed Bragg cells in such applications as the optical scanning microscopes, such as disclosed in U.S. Pat. No. 4,627,730 to Jungerman et at. In this microscope, coherent light at $\lambda=f_O$ impinges on a Bragg cell driven at a swept frequency $f_O$ (60–110 MHz). A stationary reference beam (at $\lambda=f_o$) beam and a positive doppler scanning beam (at $\lambda=f_O + f_b$) impinge on a test material and are reflected back through the Bragg cell. A negative doppler frequency shifted diffracted portion of the returning reference beam (at $\lambda=f_O-f_b$) and the non-diffracted returning scanning positive doppler beam (at $\lambda=f_O+f_b$) are focused on a detector, and circuitry selectively extracts phase and amplitude information imparted by the test material to yield the height of its surface features. A modification includes an internal optical reference in the form of a second beam in a plane which is perpendicular to the scanned output and impinges on a known flat surface. The Jungerman et at. patent discloses an output light impinging on the photo detectors as a positive doppler frequency (at $\lambda=f_O+f_b$) scan beam and a negative doppler frequency (at $\lambda=f_O-f_b$) reference beam. An important point to note is that when the Bragg cell frequency $f_b$ is varied, the two output beams (i.e., $\lambda=f_O+f_b$ and $\lambda=f_O-f_b$) also scan or move on the output photodiode surface. Thus, when $f_b$ is changed, then the tiny output photodiode must also be moved to track the scanned output pair beam. Thus, the Jungerman device is not truly non-mechanical, as the output beams that eventually heterodyne detect and generate the $2f_b$ beat signal, are physically moving at the output photodiode plane and causing optical loss in the instrument.

Recently, M. S. Valera and A. N. Farley ("A High Performance Magnetic Force Microscope," *Measurement Sci. Tech.*, Vol. 7 (Jan. 1996), pp. 30–35) have proposed a differential heterodyne optical interferometer for magnetic force microscopy applications. Although the optical structure of this heterodyne interferometer is based on a simple Bragg cell using a reflective geometry, similar to Jungerman's patent, there is a key difference between the output beams at the photodiode that generate the heterodyne detected $2f_B$ frequency signal. In the Valera and Farley instrument, the output heterodyne signal at $2f_B$ is generated by the interference of the undiffracted zero doppler shifted light beam at a $f_O$ light frequency, and the doubly diffracted twice positive doppler shifted light beam at a $f_O+2f_b$ light frequency. Valera and Farley state that these two beams appear after double passage through the Bragg cell, and appear on the optic axis. They call the $f_O$ frequency beam the object beam and the diffracted $f_O+f_B$ doppler shifted and deflected beam the reference beam. Both beams are focussed and incident on a reflective cantilever that vibrates at a $f_c$ frequency. Valera and Farley state that "The spacing between these beams can be adjusted by introducing additional lenses between the Bragg cell and the objective lens." They also state that "Positioning and scanning of the sample is undertaken by a monolithic flexure stage driven by piezoelectric actuators" (in abstract of the paper). Thus, Valera and Farley use mechanical methods to optically scan the sample, and do not suggest an electronic, non-mechanical means for scanning optical beams on the test material/target. In their instrument, the Bragg cell drive frequency $f_B$ is fixed, and additional lenses and mechanical stage motion via piezo-actuators is used to scan the test material for magnetic force measurements. Thus, both optical beams on the cantilever are fixed and stationary (i.e., non-scanning).

It would be extremely desirable to have an optical heterodyne interferometer that has good phase/mechanical stability, plus has non-mechanical optical beam scanning capability for rapid inspection and evaluation of a test medium. Furthermore, it is desirable to have an interferometer where the test beam rapidly scans the test medium, yet the output light beams interfering at the output detector plane are fixed and stationary to provide high heterodyne detection efficiency. A novel optical heterodyne or baseband and intermediate frequency interferometer is disclosed herein which results in the realization of a high speed scanning optical interferometer with excellent mechanical stability and phase noise suppression characteristics.

SUMMARY OF THE INVENTION

The present invention addresses slow mechanical beam scanning, output beam motion, and vibration instability problems of conventional interferometers, by introducing a new kind of heterodyne optical interferometer that also has high speed, non-mechanical, inertialless beam scanning capabilities, a stationary interfering output beam pair, plus has a compact in-line design for minimizing air turbulence and other unstable phase noise effects.

Specifically, according to a first embodiment, a reflective optical interferometric scanner is provided including means for supplying coherent light and means for splitting the coherent light into a first beam and a second beam. The invention further includes a first acousto-optical device having a first channel for selectively deflecting a first portion of the first beam in accordance with a first frequency in a first direction and a second channel for selectively deflecting a first portion of the second beam in accordance with a second frequency in first direction, wherein the difference between the first and second frequencies is fixed and a second portion of the first and second beams are not deflected by the first acousto-optical device. Additionally, the invention includes a second acousto-optical device for deflecting a test beam, the test beam being part of the first portion of the first beam, and a reference beam, the reference beam being part of the second portion of the second beam, in a second direction substantially perpendicular to the first direction. In this embodiment, the test beam passes through an area of the test medium in a two dimensional scanning pattern. A reflective element is positioned to reflect the test beam and the reference beam back through the first and the second acousto-optic devices. The invention further includes detector means for detecting the test beam and for detecting reference beam, and signal processing means for generating an intermediate frequency signal from the test and reference beams, the intermediate frequency signal bearing phase and amplitude information of the test medium.

In a second embodiment, a scanning spot heterodyne optical interferometer includes means for providing a first coherent light beam and a second coherent light beam having a frequency different from the first coherent light beam. Light combining means combines the first and second light beams into a collinear beam composed of two wavelengths. Further, first means splits the collinear light beam into fixed beams unaffected by the first means and test beams varying in spatial position in a first direction in accordance with a signal input to the first means and producing a frequency shift in the test beams relative to the fixed beams. A first light deflector deflects the fixed and test beams in a second direction perpendicular to the first direction. A test medium, onto which the test beams impinge as it varies in spatial position in the first and second directions perpendicular to an optical axis of the interferometer, impartes a further frequency shift onto the test beams. A second means recombines the fixed beams and the test beams from the first means and providing the test beams with a further frequency shift relative to the fixed beams, wherein the fixed beams and the test beams are collinear and unmoving in at least the first direction. Means for detecting test medium phase information from the test beam is also provided.

In yet another embodiment, a scanning heterodyne optical interferometer includes means for providing a coherent light beam, and first means for splitting the coherent light beam into a fixed beam unaffected by the first means and a test beam varying in spatial position in accordance with a signal input to the first means and producing a frequency shift in the test beam relative to the fixed beam. The invention further includes a test medium onto which a first part of the test beam impinges as it varies in spatial position in a first direction perpendicular to an optical axis of the interferometer, the test medium imparting a further frequency shift onto the first part of the test beam but not a second part of the test beam. The invention also includes a second means for recombining the fixed beam from the first means and the test beam and providing the test beam with a further frequency shift relative to the fixed beam, wherein the fixed beam and the test beam are collinear and unmoving in at least the first direction. Finally, means for detecting test medium phase information from the first and second parts of the test beam is provided.

Yet another embodiment of the present invention is a scanning heterodyne optical interferometer including means for providing a coherent light beam and first means for splitting the coherent light beam into a fixed beam unaffected by the first means and a first scanning beam shifting in spatial position and frequency. This embodiment further includes second means for splitting the first fixed beam into a second fixed beam unaffected by either first or second means and a second scanning beam shifting in spatial position and frequency, and for splitting the first scanning beam into a third scanning beam shifting in spatial position and a third fixed beam unaffected by the second means. The second and third fixed beams are collinear and the second and third scanning beams are collinear. Further, first and second polarizing beam splitters split polarized light components of the collinear second and third fixed beams and the second and third scanning beams. Components of each pass through a test medium and other components of which act as a reference. Detecting means for determining phase differences between respective components is also provided.

Interferometers in accordance with the present invention can be used as a variety of optical instruments such as holographic interferometers, interferometric sensors, material characterization tools such as thin film/surface characterization, diagnostic measurement systems such as turbulence and flow/temperature assessment, holographic recording and retrieval, shock wave measurements, material optical birefringence measurements, free-space optical sensing such as wind tunnel, combustion, and flame diagnostics and testing, fiber-optic remote sensing, magnetic force microscopy and optical force microscopy (optical tweezers for holding, e.g., atoms).

Until the present invention, no heterodyne optical interferomic systems have been proposed for interferometric sensing and measurement tools that offer high optical power (e.g., 1 W CW), non-mechanical high speed scanning (e.g., <50 µs per scan spot), stationary output beam pair, interferometer systems with heterodyning, intermediate frequency, and almost baseband options for accurate diagnostic measurements. The interferometers disclosed herein can have high optical power (>100 mW) tolerance, and both CW and high peak power pulsed sources can be used as the light input. The bulk optics nature of the disclosed optical system designs allow for high optical power interferometric applications.

Other advantages of the inventive interferometers include high mechanical/optical phase stability, high speed optical scanning, stationary output beam pair for high efficiency photo-detection, low system noise via the IF heterodyne detection option, and both reflective and transmissive system options.

BRIEF DESCRIPTION OF THE DRAWINGS

These and other features and advantages of the present invention will now be described by way of exemplary embodiments with reference to the drawing figures, in which:

FIGS. 2(c) and 2(d), respectively show top and side views of ray traces in a portion of the point scanning interferometer shown in FIG. 2(a);

FIG. 4(e) shows another transmissive interferometer which is set-up to reflect light back through the test medium in accordance with a variation on the third embodiment of the present invention;

FIG. 4(f) shows an additional transmissive interferometer which is set-up for high frequency IF outputs and a point/line scanning probe/test beam in accordance with a variation on the third embodiment of the present invention;

DETAILED DESCRIPTION OF EXEMPLARY EMBODIMENTS

First Embodiment of the Present Invention

Figure 2A:
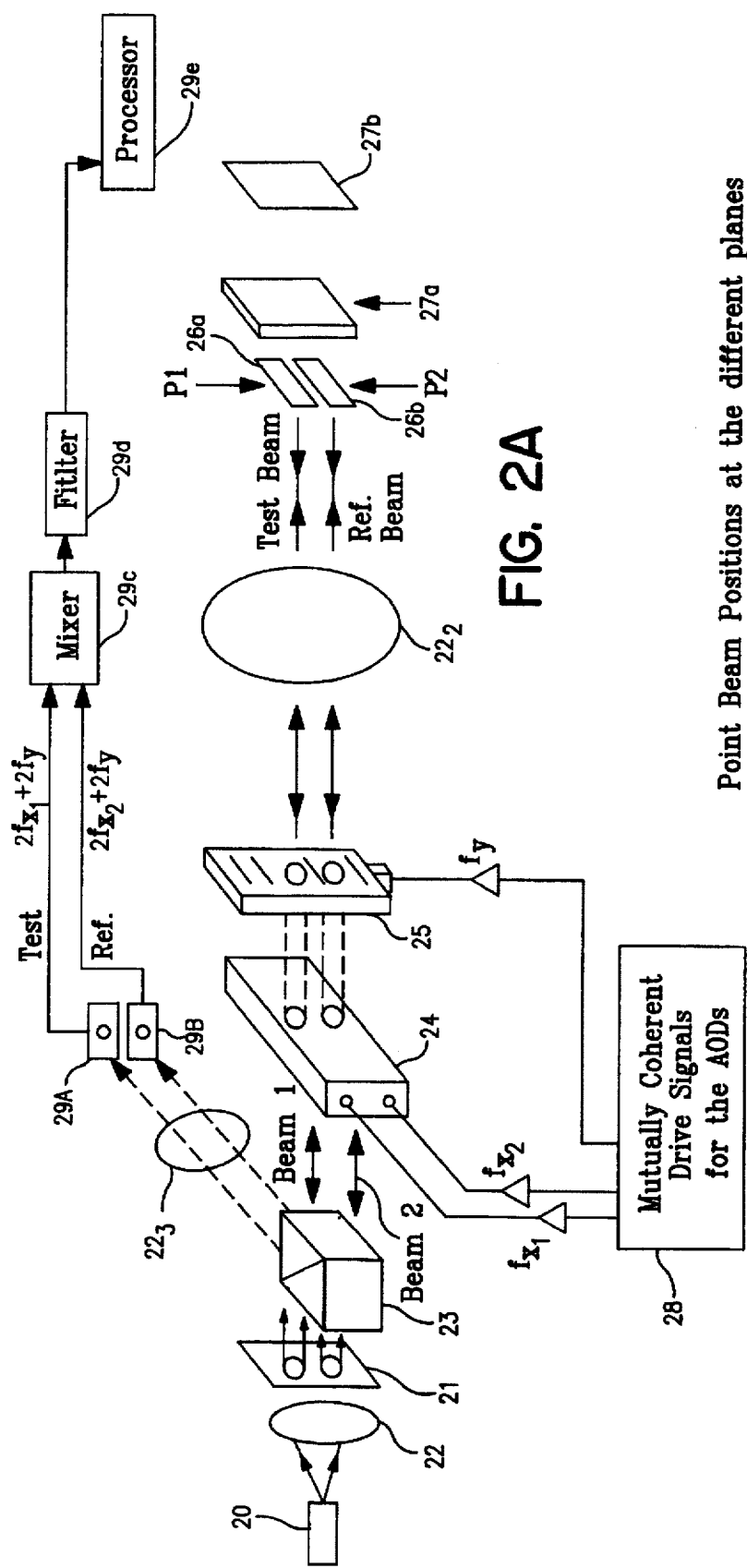
FIG. 2(a) shows a reflective, point scanning heterodyne optical interferometer for optical measurement and sensing applications of transmissive objects, in accordance with a first embodiment of the present invention.

FIG. 2(a) illustrates a reflective, high speed optical interferometric scanning measuring and testing instrument which uses only a pair of fixed point photo detectors. In this embodiment, coherent light from a laser source 20 after being collimated by a spherical lens $22_1$, is split into a first and a second beam by suitable optics 21, such as diffractive optics using a diffractive grating or the equivalent. The two beams have different optical frequencies. The two collimated linearly polarized light beams pass through a polarizing beam splitter 23, the function of which is explained later, but it does not substantively effect the two collimated beams in this direction. Each of the two beams impinges on a first Acousto-Optic Deflector (AOD) 24, in this example, a Bragg cell.

The first AOD 24 has two channels corresponding to the first and second collimated beams, each channel being driven by a different frequency, $f_{x1}$ and $f_{x2}$, respectively. Instead of a two channel AOD, two separate single channel AOD's could also be used.

Each of the two beams is divided into an unmoving undiffracted or DC beam and a scanning +1 (or -1) order doppler shifted diffracted beam. The scanning +1 (or -1) beam is scanned in an x-direction perpendicular to the crystal planes of the first AOD 24, and so the first AOD 24 effectively acts as an x-deflector. The resulting four beams (two DC beams and two scanning beams) impinge on a second AOD 25 which is oriented so its crystal planes are 90° relative to the crystal planes of the first AOD 24. A third frequency $f_y$ controls the deflection of the four beams in a y-direction, which is orthogonal to the x direction and the optical axis of the interferometer. The y-direction scan can be controlled by a number of devices, such as a programmable phase grating in the y-direction, such as a birefringent mode 1-D NLC array, a 1-D polymer dispersed LC holographic device, or a bulk electro-optic crystal or an AOD, as shown in FIG. 2(a).

The impinging four beams are likewise split into four pairs of separate beams, a first pair of which are unmoving DC beams unaffected by either AOD 24, 25, a second pair of which are unaffected by the first AOD 24 but are diffracted by the second AOD 25, a third pair of which are diffracted by the first AOD 24 but not the second AOD 25 and the fourth pair of which are diffracted by both the first and second AOD's 24 and 25 and have frequencies of $f_{x1}+f_y$ (beam 1) and $f_{x2}+f_y$ (beam 2). It is the first and fourth set of beams that are of interest. These first and fourth beams are shown in the ray traces of FIGS. 2(b) (top view) and 2(c) (side view). These beam pairs are shown in FIG. 2(d) which illustrates that the second and third pairs of beams are blocked as shown by the shaded areas at planes P1 and P2, whereas the first and fourth beam pairs are not blocked.

Hereinafter, the DC and diffracted beam pair corresponding to the first beam generated at the diffractive optics 21 will be referred to as the "test beam" and the first (DC) and fourth (diffracted) beams resulting from the second beam generated at the diffractive optics 21 will be referred to as the "reference beam".

The test beam passes through a test medium 26a while the reference beam does not. The reference beam may optionally pass through a calibration plate 26b. The linearly polarized test and reference beams then pass through a quarter wave plate (QWP) (or Faraday rotator of a power of 45°) 27a, reflect off a mirror 27b and back through the QWP (or Faraday rotator) 27a. The QWP (or the Faraday rotator) 27a imparts a total polarization rotation of 90° on the resulting reflected test and reference beams.

The reflected test and reference beams are collinear with the test and reference beams between the PBS 23 and the mirror 27b. The spatially blocked components of diffracted beams would not be collinear and they are blocked to prevent interfering effects they might otherwise have.

It should be noted that suitable focusing optics $22_2$, such as a spherical lens, is interposed between the second AOD 25 and the mirror 27b to focus the test and reference beams on a focal plane at which the test medium 26a (and optional calibrator 26b) are positioned.

The reflected test and reference beams are collinear with the first and second beams between the PBS 23 and the first AOD 24 but, due to the polarizing optics of the PBS 23 and QWP (or Faraday rotator) 27a, the reflected vertically polarized beams are separated toward a pair of photo detectors 29a and 29b. Suitable optics $22_3$, such as a spherical lens, focuses the reflected test and reference beams onto the photo detectors 29a and 29b. The photo detectors 29a and 29b only detect the components of the test and reference beams that are stationary at the output plane.

In operation, the x-deflection frequencies $f_{x1}$ and $f_{x2}$ are changed to effect scanning in an x-direction, but the difference in the frequencies $\Delta f$ is maintained constant so that the scanning beams are maintained at a constant spatial relationship. The y-deflection frequency is changed much more slowly and in steps to change the y-position of the scanning beams. The various frequencies $f_{x1}$, $f_{x2}$ and $f_y$ are controlled to effect raster scanning (either zig-zag or serpentine) in the x-y plane over an area corresponding to an area to be tested.

By selecting only the DC and double diffracted components of the first and second initial beams, the output beams (i.e. the reflected test and reference beams) are maintained at a fixed position for easy high optical efficiency interferometric heterodyne detection by a pair of stationary/fixed point detectors. Also, by using two orthogonally oriented AODs or the like, the normal diffraction line forms point beams when using the spherical lens $22_2$. This embodiment constitutes a point scanner rather than a line scanner, thereby avoiding the need for mechanically scanning one or more detectors or using one or more electronically scanned (e.g., CCD) detectors.

Also, by use of a test and separate reference beams, the signal processing can use an intermediate frequency (IF) signal, as explained with reference to the signal processing circuitry.

The signal processing circuitry takes the signals generated at the first and second photo detectors 29a and 29b corresponding to the reflected test and reference beams, respectively. The test signal is $2f_{x1}+2f_y$ and the reference signal is $2f_{x2}+2f_y$, which are passed through a mixer 29c and a band pass filter 29d to result in an intermediate frequency $\Delta f$ bearing the phase and amplitude information about the test medium 26a. This fixed (if desired) intermediate frequency $\Delta f=(2f_{x1}+2f_y)-(2f_{x2}-2f_y)=2(f_{x1}-f_{x2})$ is then processed in a post-processor 26e. Stated another way, by the use of two beams and the x-y deflection mechanism, two mutually diagonally separate x-y spots are used to develop a relative phase/amplitude change measurement using the phase meter (mixer 29c at the output of the system).

Second Embodiment of the Present Invention

Figure 3A:
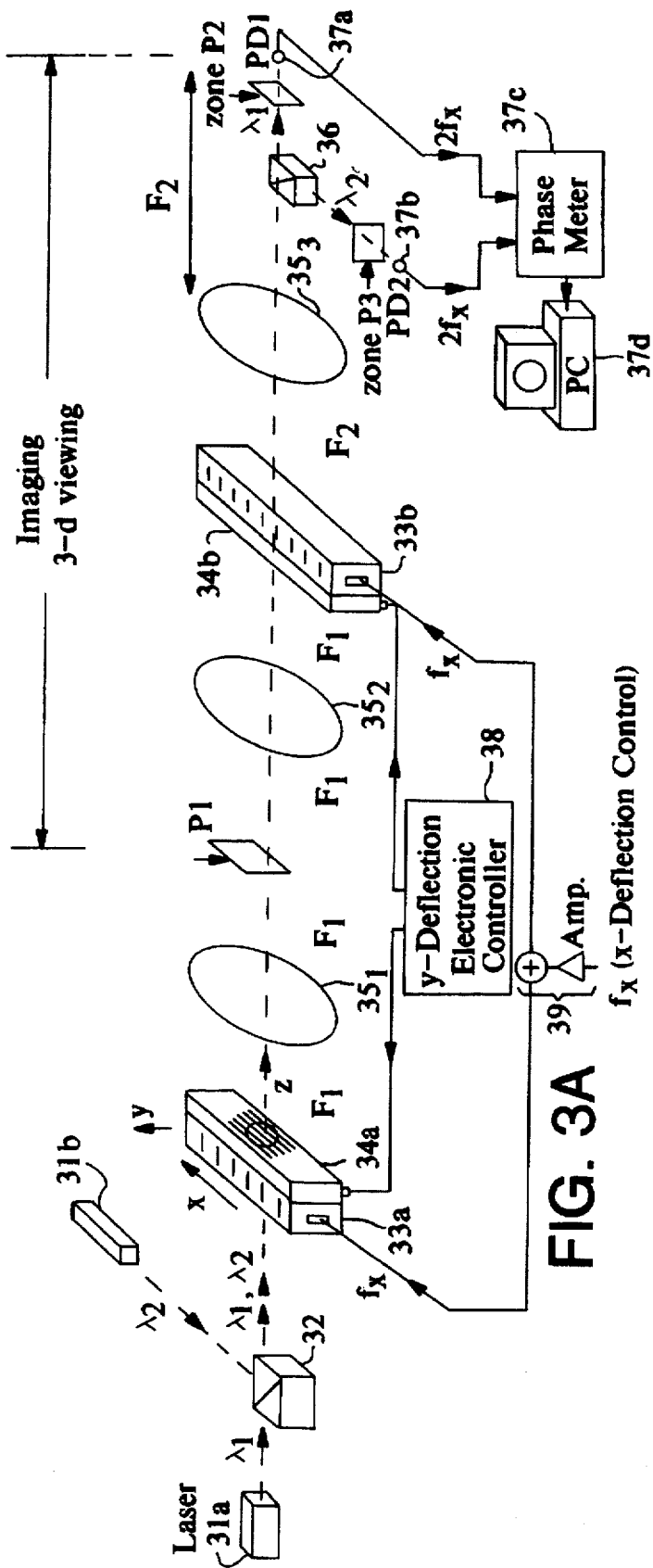
FIG. 3(a) shows a transmissive, two point scanning heterodyne optical interferometer for three dimensional optical measurement and sensing applications of transmissive objects, in accordance with a second embodiment of the present invention.

FIG. 3(a) illustrates a transmissive high-speed two point scanner for heterodyne three dimensional measurement and testing. In this third embodiment, two different laser sources 31a and 31b are used. The laser sources may take the form of separate lasers 31a and 31b, one of which may have a wavelength tuning control, the benefit of which is explained below.

The coherent light output from the first laser 31a at a first wavelength $\lambda_1$ and coherent light output from the second laser 31b at a wavelength $\lambda_2$ are combined to be collinear in a dichroic beam splitter (DBS) 32. The DBS 32 acts as a two-color beam combiner in this embodiment. The collinear coherent light composed of wavelengths $\lambda_1$ and $\lambda_2$ is input into a first acousto-optic deflector 33a, such as a Bragg cell, the crystal planes of which are parallel to the y-z plane as illustrated in FIG. 3a. The first AOD 33a effectively acts as a beam splitter for each wavelength $\lambda_1$ and $\lambda_2$, each wavelength $\lambda_1$ and $\lambda_2$ having a DC beam portion which is unaffected by the first AOD 33a and a diffracted portion in the form of a +1 diffraction beam having a frequency of $\lambda_1+f_x$ and $\lambda_2+f_x$ for the $\lambda_1$ and $\lambda_2$ input beams, respectively, their frequency shift is being imposed by the frequency $f_x$ generated by a x-deflection control 39 operating the first AOD 33a. The x-deflection control may consist of a frequency generator (not shown), an amplifier and a signal dividing circuit. The first AOD 33a effectively acts to deflect the diffracted portion of the $\lambda_1$ and $\lambda_2$ beams in an x direction, which is perpendicular to the crystal planes of the Bragg cell as illustrated in FIG. 3(a).

Juxtaposed to the first AOD 33a is a y-deflector 34b. The y-deflector 34a can take the form of a programmable grating in the y-direction, such as a thin film, e.g., a parallel-rub birefringent-mode 1-D NLC array, a 1-D polymer dispersed LC holographic grating device or a bulk electro-optic crystal or an AOD. The y-deflector 34a is controlled by a device control signal from a y-deflection electronic controller 38, the operation of which is more fully explained below. The resulting four beams (undeflected $\lambda 1$, undeflected $\lambda 2$, deflected $\lambda_1+f_x$, deflected $\lambda_2+f_x$) pass through 1:1 imaging optics such as spherical lenses $35_1$ and $35_2$ having focal lengths of $F_1$, the first Bragg cell and y-deflector 33a and 34b being in the opposing focal plans thereof. Intermediate between the two spherical lenses $35_1$ and $35_2$ is a two-point scanning test zone P1, which is more fully explained below, where the test medium is positioned. On the opposing focal plane of the imaging optics $35_1$ and $35_2$ is another combination of a second y-deflector 34b and a second AOD 33b.

The four beams of light from the first wide y-deflector 34a are focused onto a second y-deflector 34b, which is juxtaposed to the second AOD 33b. These devices are controlled by signals which are identical to control signals for the first AOD 33b and first y-deflector 34b. The output of the second AOD 33b passes through a third spherical lens $35_3$ having a focal length of $F_2$.

In the imaging plane of the third spherical lens $35_3$ are two photo detectors 37a and 37b. Each photo detector 37a and 37b detects a different wavelength. Specifically, the first photo detector 37a detects the first wavelength $\lambda_1$. The second photo detector 37b detects the second wavelength $\lambda_2$ which is separated from $\lambda_1$ through the use of a second DBS 36. The outputs of the first and second photo detectors 37a and 37b, which constitute double diffractive light beam components having a frequency of $2f_x$, are fed into a phase meter 37c, which subsequently outputs phase and amplitude information to a personal computer 37d for phase/amplitude map reconstruction of the test zone illustrated in FIG. 3(a) between the first and second spherical lenses $35_1$ and $35_2$.

Figure 3B:
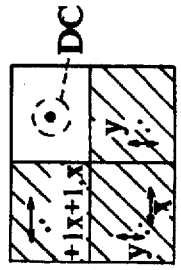
FIG. 3(b) shows point beam positions at different planes in the point scanning interferometer shown in FIG. 3(a)
Figure 3B:
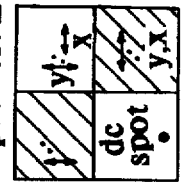

Having described the physical structure of the transmissive high-speed two point scanning design, the operation of which will now be described with reference to FIG. 3(b) which illustrates the status and descriptions of the various zones shown in FIG. 3(a). The two point scanning test zone P1 shown between the first and second spherical lenses $35_1$ and $35_2$ illustrates the disposition of the various four beams mentioned above. As illustrated, only the fixed position DC-beam and the x-y scan beams go through to the next stage of the instrument, the other beams being blocked. The DC-beam is unaffected by the first AOD 33a. However, the two diffracted light beams corresponding to $\lambda_1$ and $\lambda_2$ scan in both the x and y directions. The first AOD 33a causes the beams to scan in the x direction by sweeping the frequency $f_x$. Because there are two different frequencies input representing coherent light $\lambda_1$ and $\lambda_2$, the dots are separate. However, because the difference between the frequencies $\lambda_1$ and $\lambda_2$ is controlled, particularly in light of the tunable nature of the second laser 31b, the spacing between the two dots is selectively controlled and typically constant (except when the second laser 31b is being tuned). The y-deflector 33b affects scanning in the y direction. Through a combination of the x and y scanning, an entire area of the test zone can be tested by raster scanning, either following a zig-zag pattern or a serpentine pattern.

In the second test zones P2 and P3 corresponding to the area of the photo detectors 37a and 37b, as illustrated in FIG. 3(c), the output of the detector zone for $\lambda_1$ and $\lambda_2$ is a fixed spot that contains the $\lambda_1$ DC spot and the double diffracted $2f_x$ test point beams. The interface generates the two $f_x$ signal via the first photo detector 37a. The third test zone P3 is the same as the P2 zone, except, that the light is at $\lambda_2$ and that the heterodyne signal from the second photo detector 37b. The other areas are blocked off, as indicated by the shading in FIG. 3b.

Because of the use of two point scanning beam, a three dimensional image can be generated via the phase meter 37c and the personal computer 37d using known signal processing techniques. Specifically, true 2-D/3-D point scanning is made possible using only a pair of point photo detectors. In this transmissive design, the two coherent light sources 31a and 31b create a pair of points at the test scan plane P1. By comparing the relative amplitude and phase between these two heterodyne detected signals that correspond to the two points on the test scan plane P1, a phase and amplitude 2-D/3-D map characterizing the test medium can be drawn.

The use of two colors is fundamental to the operation of this point (instead of line) scanning system because the slight difference in wavelength causes the generation of two mutually diagonal, physically separate x-y scanning spots. These spots enable the generation of relative phase/amplitude change measurements using a phase meter (mixer) 37c at the output of the system. Because optical Bragg diffraction/light deflection is proportional to the optical wavelength used, different wavelengths give different deflection angles, hence the two physically separated spots, both at the scan test plane and the interferometer's output non-scanning plane. The system can be fine-tuned by using the tunable laser 31b. Also, the two lasers 31a and 31b do not have to be mutually coherent or phase locked. It is possible to use a single, two line/two color laser currently commercially available such as the Zeeman effect laser that emits two collinear lines with orthogonal polarizations.

Third Exemplary Embodiment of the Invention

Figure 1:
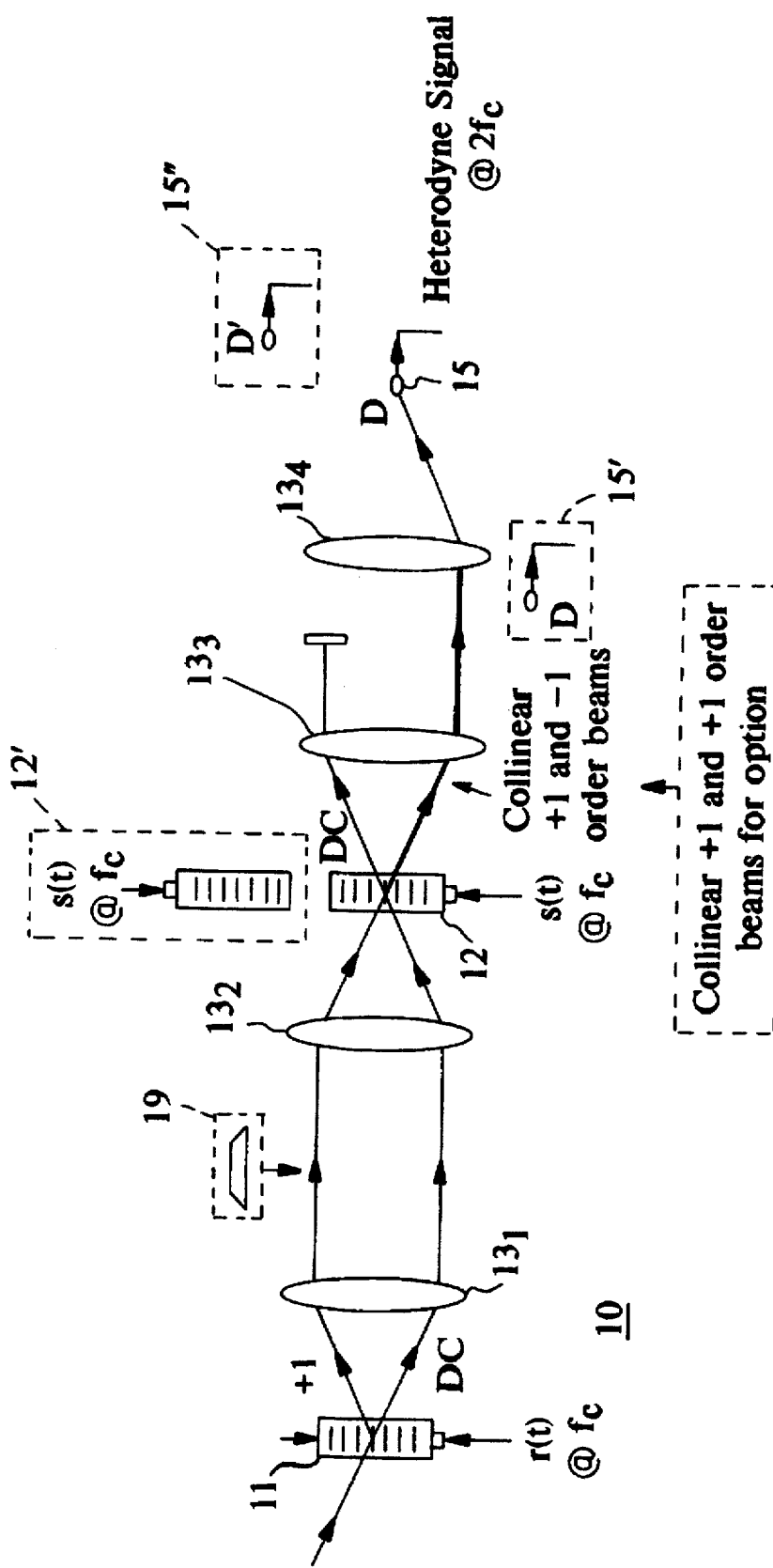
FIG. 1 shows a basic conventional in-line acousto-optic interferometer architecture for several photonic signal processing applications.
Figure 4A:
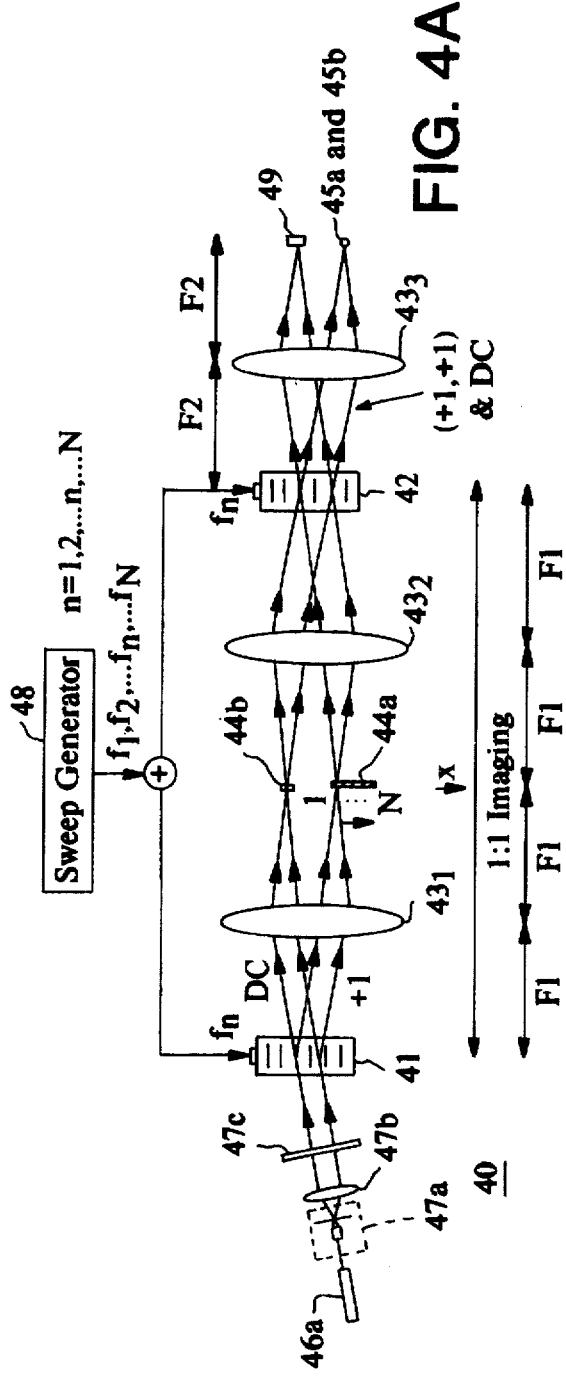
FIGS. 4(a) and 4(b) respectively show top and side views of a scanning heterodyne optical interferometer for transmissive optical measurement and sensing applications, in accordance with a third embodiment of the present invention.
Figure 4B:
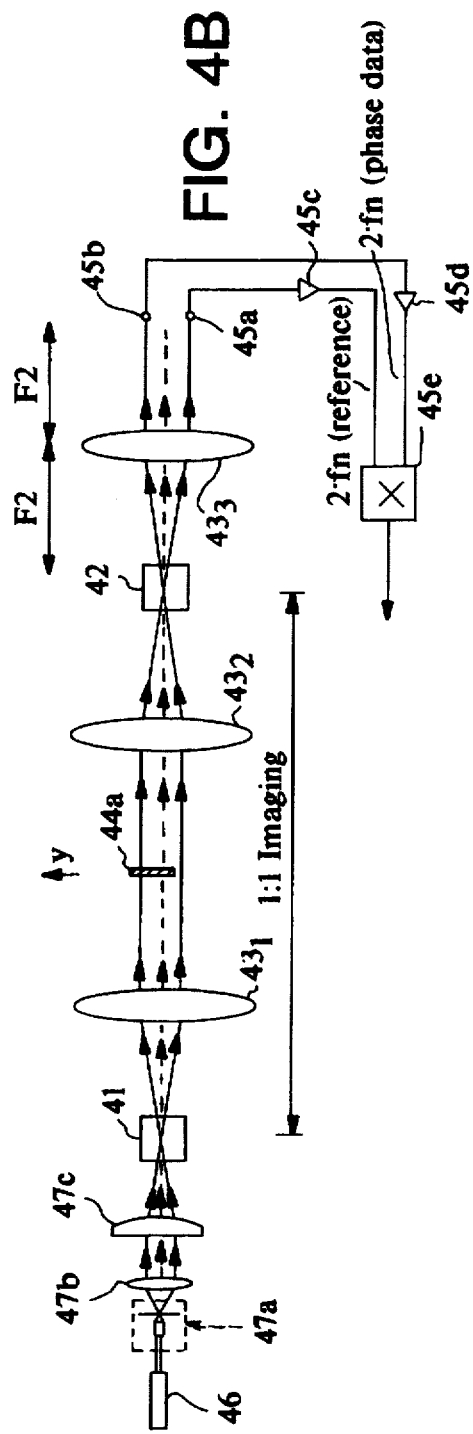

FIGS. 4(a) and 4(b) show top and side views of a novel scanning heterodyne optical interferometer for transmissive optical sensing applications, which has been experimentally set-up in a laboratory. The basic architectural and component structure gives the scanning interferometer its exceptional mechanical/vibrational stability and component simplicity, as with the interferometer of FIG. 1. The scanning interferometer of FIGS. 4(a) and 4(b) includes an important design difference wherein light beams generate desired test medium phase information at a fixed position relative to the x-direction (which is orthogonal to the optical axis of the optical system and the crystal planes of the Bragg cells) on heterodyne photo detectors 45a and 45b at an output interference plane.

To achieve a high speed, non-mechanical scanning interferometer, where a particular beam scans the test medium while a fixed photo detector at the output interference plane picks up the resulting test medium phase information, the final output plane collinear interfering beams are fixed at the detector location. In the inventive design shown in FIGS. 4(a) and 4(b), this is done by using Bragg diffractions of the scanning signal or test beam at both Bragg cells 41 and 42 in the system 40. Thus, the double diffraction process prevents the scanned beam from moving at the final output/detection plane, and a single fixed photo detector 45b (in the x-direction) is sufficient to generate the desired phase-modulated $2f_n$ carrier signal. Nevertheless, the test beam (the diffracted order) between the two Bragg cells rapidly scans the test medium along the x-direction as a stepped frequency linear frequency modulated (FM) signal is fed to both Bragg cells 41 and 42. Thus, the interferometer 40 performs the required high speed electronically controlled optical scanning of the test zone of a test medium 44a that is inserted in the interferometer 40 for phase/material feature mapping purposes, for example.

In the experimental set-up shown in FIGS. 4(a) and 4(b), a horizontally or p-polarized light from a 100 mW, 532 nm, diode-pumped ND:YAG laser 46, for example, passes through a spatial filter assembly 47a consisting of an objective lens (x40, NA=0.65) and a 15 μm diameter pinhole. A 5 cm focal length (FL) spherical lens 47b is used to collimate the laser light in this example. Using a 30 cm FL cylindrical lens 47c, the collimated laser light is Bragg-matched as a line in the first acousto-optic deflector (AOD) 41. The first AOD 41 and the second AOD 42 can be flint glass Bragg cells from IntraAction Corp. with a center frequency $f_c$ of 70 MHz and a bandwidth of 40 MHz at 633 nm, for example. Both AODs 41 and 42 have an operating wavelength of 400–700 nm with λ=633 nm being the design wavelength in this example. The active AOD aperture is 39 mm×2 mm with an access time of 10 μs in this experimental set-up. The maximum driving power for these devices is 4 W and the input impedance is 50 Ω.

Both AODs 41 and 42 are driven by a sinusoidal signal of frequency $f_n$ from a sweep generator 48 where $f_n$ corresponds to the stepped frequency at the $n^{th}$ spatial line scanned by the optical beam on the test medium. The number n varies from 1, 2, . . . N, where N is an integer representing the maximum number of scanned positions along the x-direction on the test medium. In the experiment, both Bragg cells 41 and 42 were driven by 0.73 watt single tone rf signals (in the range from 50 MHz to 90 MHz) from a Wavetek Model 5135A frequency synthesizer acting as the sweep generator 48. The Bragg matched diffraction efficiency for the +1 orders measured for this rf AOD drive power for both Bragg cells 41 and 42 was 40%.

Using the well-known Bragg diffraction condition, the deflection angle (relative to the undiffracted DC beam) $\Theta_d$ for these flint glass Bragg cell devices with an acoustic signal velocity of $v_a$=3.846 mm/μs can be approximately given according to the wavelength λ(μm) and frequency $f_n$ (MHz) by $$\Theta_d \text{ (milli-radians)} = \{\lambda(\mu m) \times f_n(MHz)\}/\{v_a(mm/\mu s)\}. \quad (1)$$

This relation along with the Focal Length (FL) $F_1$ of the imaging lenses determines the limits to the test medium scan area of the interferometer. Using this relation, the DC and +1 beam separation at the test medium plane $\Delta x_{DC,+1}$ can be approximately This relation along with the Focal Length (FL) $F_1$ of the imaging lenses determines given by the design relation $$\Delta x_{DC,+1} = \Theta_d F_1, \quad (2)$$

where $F_1$ is the focal length of the first lens $43_1$ after the first AOD 41 along the optical path. These system issues along with scanning along the vertical or y-direction of the test medium will be further discussed below.

The light output from the first AOD 41 consists of a DC or undiffracted beam and a +1 positive Doppler shifted diffracted beam. These DC and +1 order beams are 1:1 imaged by an imaging system including two spherical lens $43_1$ and $43_2$ onto the second AOD 42. The two lenses $43_1$ and $43_2$ have focal lengths of 15 cm in this example. The +1 diffracted order passes through the test medium and is then diffracted one more time by the second AOD 42, while a large portion of the DC beam from the first AOD 41 passes through the second AOD 42. The +1 double diffracted beam that is diffracted by both the first and second AODs 41 and 42 Bragg cells, and the DC beam originally coming from the laser source 46, become collinear after the second AOD 42, as shown by the lower ray trace in FIG. 2a.

When the test medium 44a is optically scanned in the x-direction by feeding the Bragg cells 41 and 42 with a frequency swept signal, only the +1 double diffracted beam and DC beam from the laser stay fixed on the unmoving photo detector 45b (in the x-direction) that is positioned at the Fourier plane of the second Bragg cell 42. The other diffracted beam pair from the Bragg cells 41 and 42 does not remain stationary, and is blocked at the output interference plane using a spatial block 49. A third, 12.5 cm FL lens $43_3$ is used to separate the desired and unwanted beam pairs in space and thereby acts as the spatial filter in this experimental set-up.

From the side view of the system in FIG. 4b, it should be noted that a minimum of two spatially separate high speed detectors 45a and 45b are desired at the interference plane of the system. This is because the lower detector 45a (along the y-direction) generates the $2f_{nref}$ frequency phase-reference signal for an electronic phase meter (mixer) 45e, while the heterodyne detected $2f_{nphase}$ frequency signal coming from the top fixed (along the x-scan direction) photo detector 45b contains the test medium phase data. As illustrated in FIG. 4(b), the reference beam does not pass through the test medium.

Both the reference-phase and test medium-phase frequency signals are fed to the electronic phase meter for test medium phase map generation. After dc electrical bias removal, the heterodyne signal $i_s(t,n,m)$ generated by the top photo diode 45b can be expressed as $$i_s(t,n,m) = A_{nm} \cos[2\pi(2f_{nref})t - \Theta_{nm}], \quad (3)$$

while the reference-phase signal from the bottom photodiode can be expressed as $$i_R(t) = A_{dnm} \cos[2\pi(2f_{nphase})t], \quad (4)$$

where $A_{dnm}$ is a variable amplitude level generated mainly due to the nonuniform diffraction efficiency of the Bragg cells over the scan range, and $A_{nm}$ is the $nm^{th}$ scan position dependent variable amplitude level that is determined mainly by the transmittance function of the test medium and the Bragg cell diffraction efficiencies, $\Theta nm$ is the optical phase imparted to the scan beam at the $n^{th}$ x-direction scan position and $m^{th}$ y-direction scan position of the top detector 25b relative to the test medium 44a. Using automatic gain controlled (AGC) amplifiers 45c and 45d on both the scan signal and the reference signal, fixed amplitude level reference and test scan are fed to a zero-crossing phase meter 45e, which outputs a test medium phase map and phase meter DC level. Constant amplitude signals must be fed to the phase meter 45e to get accurate phase data readings as the phase meter 45e operates as a signal mixer and low pass filter that generates a dc level that is proportional to the phase difference between the two signals. This technique has been used previously with high success, with better than 0.1° phase measurement accuracy.

The y-scan index "m" has been used to represent test medium scanning in the vertical or y-direction. This y-direction scanning can be achieved in two ways using the system in FIGS. 4(a) and 4(b). In one design, because a vertical line scans the test medium in the x-direction via the use of Bragg cells 41 and 42, a vertical line also appears at the output interference plane. Thus, by mechanically scanning the top detector 45b in the y-direction after completing the n x-scan positions, a complete x-y two dimensional phase map of the test medium 44a can be generated.

Another approach which does away with the point detector y-motion is to replace the single top detector 45b with a K-element linear high speed detector array in the y-direction. In this way, the output of the system are K simultaneous $2f_{nphase}$ frequency phase modulated signals corresponding to the K resolution points along the y-direction on the test medium 44a. This method does away with mechanical motion at the cost of introducing parallel phase-detection electronics.

In the experimental set-up, two high speed photo detectors from New Focus, Inc. were used. These Model 1801 high-speed photoreceivers have 0.9 mm active diameters with detector operation from dc—120 MHz.

At the focal plane of the first AOD 41 where the vertical line shape DC beam passes, a programmable optical phase modulation device 44b (or array of devices along the y-direction) can be placed for phase error cancellation and system phase calibration purposes. For instance, possible phase errors in the external reference and scan signal chain electronics can be calibrated for by setting the optical phases on this electronically controlled phase shifter array to the desired values for the spatially different (along the y-direction) DC reference beams corresponding to the different +1 order reference and scan signal beams along the y-direction at the Fourier plane of the first lens $43_1$. For instance, the reference-phase heterodyne detected signal from the bottom detector 45a at the output plane can be calibrated to have the appropriate phase relative to the scan signals such that various component-based serial signal path phase errors are minimized, thus leading to accurate phase measurements via the electronic zero-crossing phase meter 45e.

One high grey-scale analog (e.g., >10-bits) option for this calibration optical phase shifter array 44b is a parallel-rub birefringent-mode NLC device where the NLC device is placed with its nematic director parallel to the p-polarized incident light from the laser. By changing the applied 0–5 V, 1 KHz square wave signal used to drive the NLC device, the phase of the distributed reference or DC light beams can be controlled.

With no test material in the scan beam path between the two Bragg cells 41 and 42, and using a 10 times attenuation neutral density filter (44b) between the first AOD 41 and third spherical lens $43_3$ to prevent photo receiver saturation effects, rf powers of −38.52 dBm and −32.5 dBm are generated by the scan beam photo receiver 45b and the reference beam photo receiver 45a, respectively, when using 60 MHz AO drive signals. Because of the large physical size of the New Focus photo receiver package used in the experimental set-up, a cube beam splitter (not shown) was placed after the spherical lens $43_3$ to generate two output planes so that the two photoreceivers 45a and 45b could be easily placed at the two different output planes. Thus, because of the splitting of the light energy, lower useful optical power was detected in this experiment.

From the side view in FIG. 4(b), the two photo detector modules are placed at the different height levels (along the y-direction) to monitor the reference and scan signal beams at reference photo detector 45a and phase photo detector 45b, respectively. A modulation depth of approximately 90% is measured for both 120 MHz signals generated via heterodyne detection at the photoreceivers 45a and 45b. Modulation depth equals $\{(V_{max}-V_{min})/(V_{max}+V_{min})\} \times 100\%$, where $V_{max}$ and $V_{min}$ are the maximum and minimum voltage levels, respectively, at the $2f_{nref}$ and $2f_{nphase}$ frequency output signals. Because the zero Doppler shifted reference beam is somewhat stronger than the double diffracted Doppler shifted scanned beam $2f_{nphase}$ (the Bragg cells are operated at near 40% diffraction efficiency (d.e.), not 50% d.e.), a slightly higher dc bias level signal is generated in the photo detected signals. Using ac-coupled IntraAction Corp. Model PA-4 power amplifiers with 40 dB gain as the AGC amplifiers 45c and 45d, the dc bias levels were filtered out, and the ac signals were amplified for viewing and phase measurements using an oscilloscope and a spectrum analyzer.

Figure 5A:
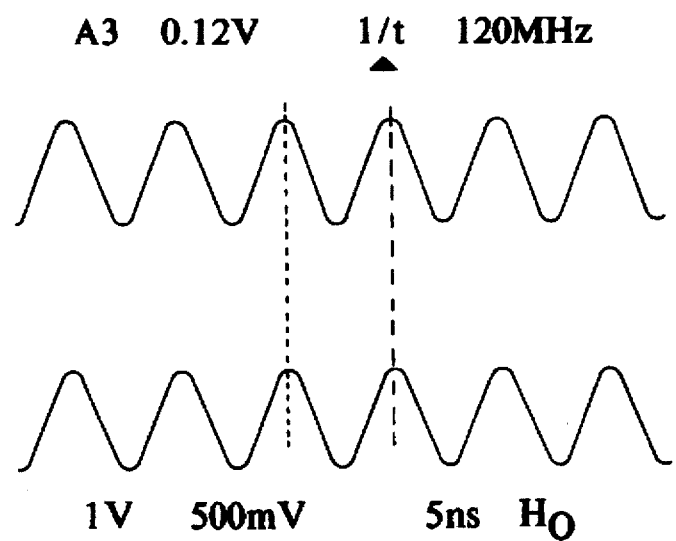
FIGS. 5(a) and 5(b) show oscilloscope traces of the amplified outputs from an in-phase reference (top trace) and scan (bottom trace) photoreceivers, when no test material is inserted into the system in accordance with the first embodiment of the present invention shown in FIGS. 4(a) and 4(b)
Figure 5B:
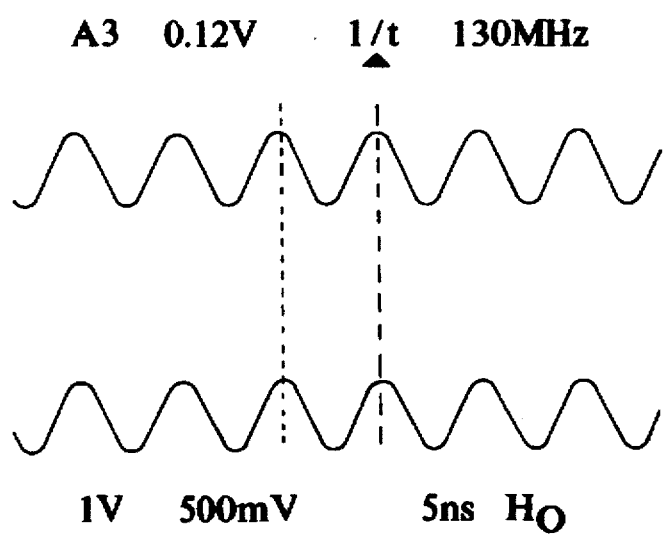

FIGS. 5(a) and 5(b) show the oscilloscope traces of the experimental amplified outputs from the reference and scan photoreceivers 45a and 45b, when no test material is inserted into the system. Regardless of the value of the AOD drive frequency $f_n$ required for scanning the optical beam, the relative phase between the reference and scan photo detector output signals remained constant. In fact, with accurately matched rf cable lengths, and symmetrically positioned optical components, the relative time/phase delay between the two detected signals should be zero, as all optical and electrical path lengths are identical.

FIGS. 5(a) and 5(b) essentially show in-phase reference (top trace) and scan signals (bottom trace) for (a) 60 MHz and (b) 65 MHz AOD drive frequency conditions, generating 120 MHz (FIG. 5(a)) and 130 MHz (FIG. 5(b)) heterodyne detected signals. Thus, with no test material inserted in the laboratory instrument, the signal pair generated by the photo-detector pair remained in-phase over the wide AOD drive frequency band (in this case, 40 MHz) required for optical beam scanning of the test material: a result that is also expected from theory due to the common optical and rf path lengths.

Next, when a test medium 44a was inserted in the scan beam path, the reference signal and the test scan signal were no longer in-phase, indicating the different optical path length caused by the different optical refractive index of the test material compared to the free-space/air medium through which the reference beams travel.

Figure 6A:
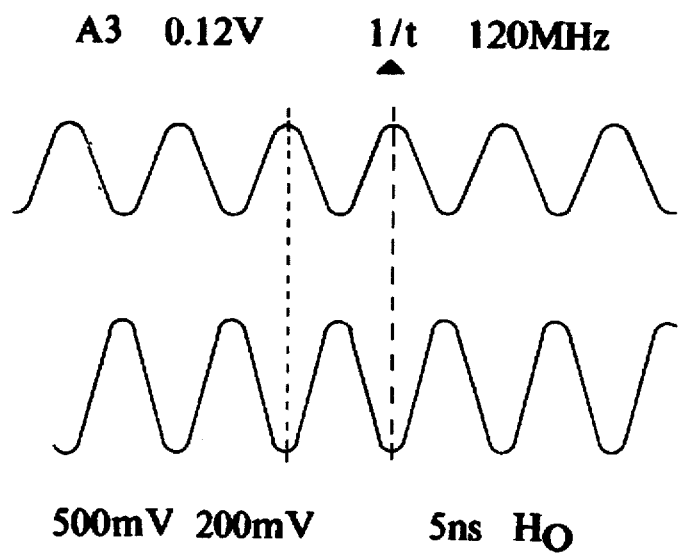
FIGS. 6(a) and 6(b) show the oscilloscope traces of the amplified outputs from the photoreceivers when a test material, i.e., a NLC cell, is inserted in the scan beam in a interferometer in accordance with the third embodiment of the present invention shown in FIGS. 4(a) and 4(b)
Figure 6B:
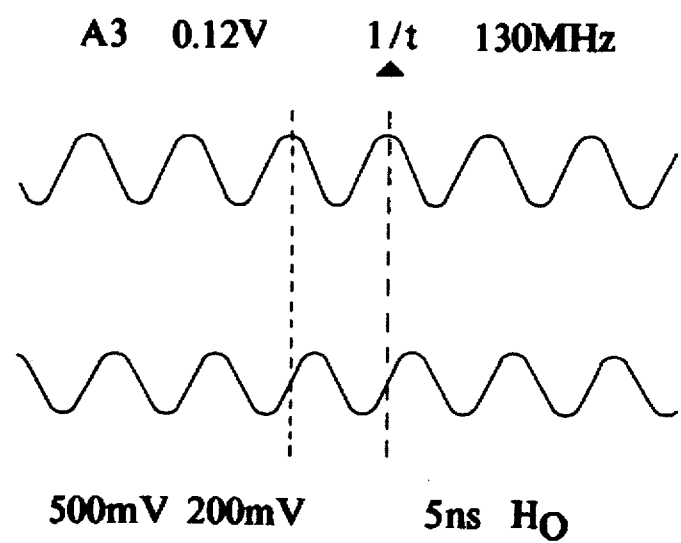

FIGS. 6(a) and 6(b) show the oscilloscope traces of the amplified outputs from the photoreceivers when the test material, i.e., in this instance a 6 µm thick parallel-rub birefringent mode NLC cell, was inserted in the scan beam in the experimental interferometer 40. FIG. 6(a) corresponds to the 60 MHz scan position, where the NLC cell was set to introduce a 180° optical phase shift to the scan beam, while FIG. 6(b) corresponds to the 65 MHz scan position, where the NLC cell is set to introduce a 90° optical phase shift to the scan beam. The NLC cell was placed with its nematic director along the linear p-polarization of the scanning optical beam. By changing the voltage level of the 1 KHz NLC cell drive signal, any desired optical phase shift can be induced between 0–3 π radians, based on the given extraordinary refractive index of the NLC material, the active NLC material thickness, the cell glass wall thickness, and the glass wall refractive index. Thus, this large area (1 cm by 1 cm) NLC cell can be used to simulate an optical phase plate with varying refractive indices.

To simulate test material optical scanning, the heterodyne detected signal-pair traces were recorded for two different frequencies of Bragg cell operation, namely, 60 MHz and 65 MHz, corresponding to different scan points along the x-direction on the NLC cell. In the first case corresponding to the 60 MHz scan position, (FIG. 4(a)) the NLC cell voltage is set to introduce a 180° optical phase shift to the scan beam. This 180° optical phase difference relative to the reference beam is accurately reflected in the equivalent 180° rf phase difference obtained between the heterodyne detected 120 MHz reference and scan signal signals. Because a 532 nm laser wavelength is being used, a 180° rf phase difference corresponds to a 266/n nm thick piece of transmissive material with a refractive index of "n".

To measure the test material optical thickness at a different position on the material along the x-direction, the AOD drive frequency is changed to 65 MHz. In this second case (FIG. 6(b)), the NLC cell voltage was set to introduce a 90° optical phase shift to the scan beam. Once again, this 90° optical phase difference relative to the reference beam is accurately reflected in the equivalent 90° rf phase difference obtained between the heterodyne detected 130 MHz reference and scan signal signals. In this case, a simulated test material optical thickness of 133/n nm is used.

Thus, using the inventive instrument, optical material properties of a test medium can be rapidly measured, using the heterodyne detected, rf phase shifted, high speed detector output signals.

An important issue related to the phase measurement accuracy of this instrument is the quality of the heterodyne detected signals that are used to make phase measurements via the electronic phase meter 45e. The experimental interferometer 40 was built on an optical table with no air isolation, and no special precautions were taken to reduce vibrations and air currents. Nevertheless, preliminary output signal carrier-to-noise ratio (C/N) measurements made using a rf spectrum analyzer indicate that high quality signals are generated by the inventive interferometer 20. In particular, direct power spectrum noise measurements were obtained using the rf power spectrum analyzer with an input filter resolution bandwidth (RBW) of 30 KHz.

An experiment resulted in a measured C/N=108.9 dBc/Hz measured at a +160 KHz offset from the 120 MHz carrier. The output signal rf dynamic range was measured to be 59.3 dB, with the noise floor level mainly controlled by the 40 dB gain power amplifier noise floor and the photo receiver shot noise. Although no direct signal phase noise measurements were taken due to lack of custom instrumentation, this phase noise was indirectly estimated.

It is well known from the radar community that accurate power spectrum measurements taken with an rf power spectrum analyzer can also give an indirect indication of the single sideband (SSB) signal phase noise. S. J. Goldman, *In Phase Noise Analysis in Radar Systems*, John Wiley, New York, 1989, p. 91. This method is commonly known as the direct spectrum method, and converts the direct spectrum analyzer power reading to the SSB phase noise measurement $N_p(f_m)$, given in dBc/Hz at $f_m$ offset by the relation:

$$N_p(f_m) = P_p(f_m) - P_c - 10 \log (B_{sa}) + P_{1a} \qquad (5)$$

where $P_p(f_m)$ is the power level measured in dBm at the $f_m$ offset frequency from the $f_n$ carrier frequency, $P_c$ is the power level measured in dBm at the $f_m$ carrier, $B_{sa}$ is the resolution bandwidth of the spectrum analyzer in Hz, and $P_{1a}$ is the +2.5 dB error correction for the characteristics of the spectrum analyzer's logarithmic amplifier. Using the experimentally measured results where $f_n=120$ MHz and $f_m=160$ KHz, $P_p(f_m)-P_c=-59.3$ and $B_{sa}=30,000$. Thus, the SSB phase noise can be estimated in the heterodyne detected, rf output signals from the experimental interferometer 20 to be −101.57 dBc/Hz at 160 KHz offset. A −60 dB rf dynamic range or equivalent 30 dB optical dynamic range was measured by the experimental interferometer 20. This indirectly implies that a 1/1000 of a fringe cycle can be measured using an interferometer in accordance with the present invention. These and other important system issues will be discussed below.

Variation of the Third Exemplary Embodiment

Figure 4C:
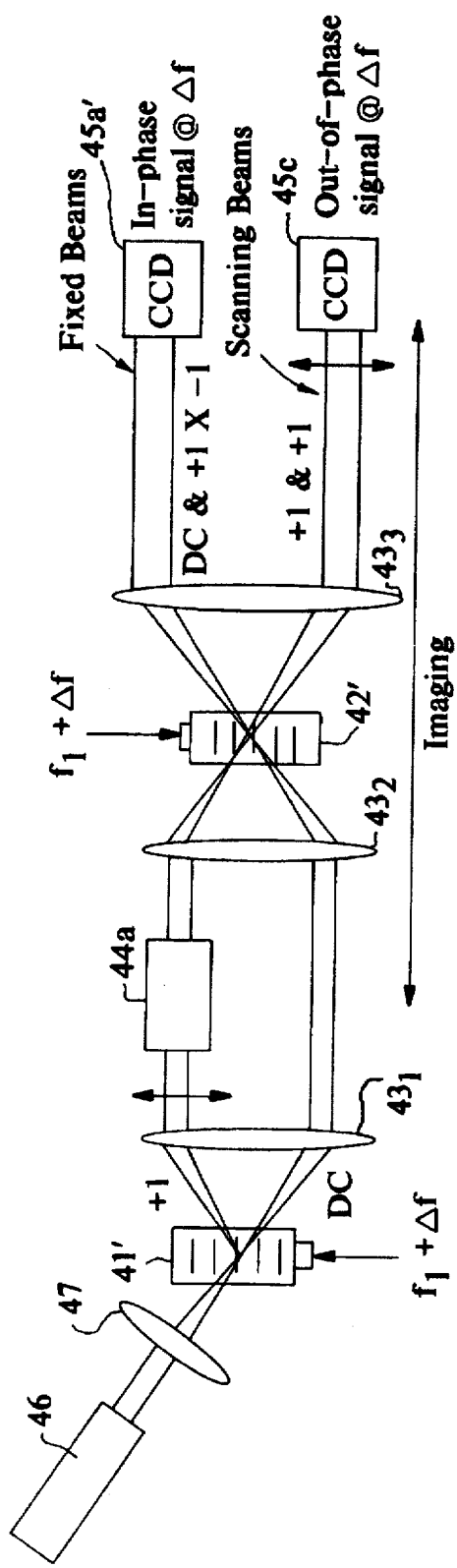
FIG. 4(c) shows another transmissive interferometer which is set-up for transmissive almost baseband optical interferometry using a slow speed photo sensor such as a charge coupled device (CCD) in accordance with a variation on the third embodiment of the present invention.

FIG. 4(c) shows a variation of the third embodiment wherein like components have like reference numbers. The interferometer is set-up for transmissive almost baseband optical interferometry using slow speed photo sensors 45a' (45a and 45b being combined) and another photo detector 45c such as a charge coupled devices (CCDs) and has a large circular cross-section probe/test beam area. This system generates an interferogram that is on a slowly varying (e.g.,Δf=1 Hz) temporal carrier that is used for gathering complete test medium phase data. This system uses AO modulators (AOMs) 41' and 42' rather than AO deflectors (AODs) 41 and 42 to generate the large test area for placing the test medium 24a.

As shown in FIG. 4(c), a laser emits coherent light which is filtered and focused by suitable optics 47 into the first AOM 41'. The first AOM 41' is modulated by a frequency $f_1+\Delta f$, where the frequency differential $\Delta f$ is much less than $f_1$. The first AOM 41' output is a DC and a +1 diffraction order beams. The +1 diffraction order beam is passed through a test medium 44a after being collimated along with the DC beam by a first spherical lens 43$_1$. A second spherical lens 43$_2$ focuses the DC and +1 order beams onto the focal plane of a second AOM 42' that is fed by frequency $f_1$. The second AOM 42' output includes fixed beams consisting of DC and double diffracted +1 ×−1 order beams, which are imaged on a CCD photo detector 45a' (which fills the function of both reference and scan detectors 45a and 45b in the embodiment of FIGS. 4(a) and 4(b)), which in response, outputs an in-phase signal at the frequency differential $\Delta f$. The scanning +1 order diffracted beams, one generated at the first AOM 41' and passing through the second AOM 42' unaffected, the other generated at the second AOM 42' from the DC beam of the first AOM 41', are imaged by a third spherical lens 43$_3$, onto a second CCD photo detector 45c. The second CCD photo detector 25c, in response, generates the out-of-phase signal at frequency differential $\Delta f$. Note that the imaging optics is formed between the first and third spherical lenses 43$_1$ and 43$_3$.

The output sensors 45a and 45c can also be holographic storage mediums such as photorefractive crystals and thin-films or any other sensing medium. It should be note that, if desired, fast spatial carriers in these interferometers can be generated using beam deflection optics such as tilt prisms or nematic liquid crystal (NLC) deflectors in one of the optical beam paths between the AOMs 41' and 42'.

Another Variation of Third Exemplary Embodiment

Figure 4D:
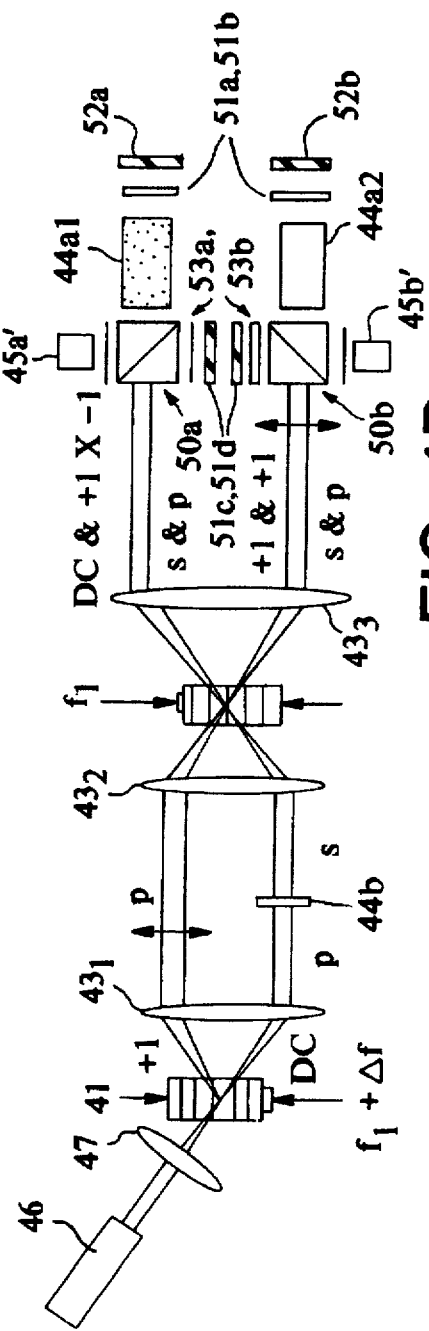
FIG. 4(d) shows yet another transmissive interferometer which is set-up for reflective almost baseband optical interferometry with large circular cross-section probe/test beams in accordance with a variation on the third embodiment of the present invention.

FIG. 4(d) shows yet another variation of the first embodiment of the transmissive interferometer which is set-up for reflective almost baseband optical interferometry with large circular cross-section probe/test beams, using polarization optics to separate the signal and reference beams. The detailed workings of this and other interferometers to follow are similar to the one in FIG. 4(c). The differences between the embodiments of FIG. 4(c) and FIG. 4(d) include that the laser 46 is p-polarized and that a half-wave plate 44b is inserted into the optical path of the DC beam from the first AOM 41'. Also, rather than being directly imaged on photo detectors, the fixed DC and double diffracted (+1 ×−1), as well as the scanning collinear +1 diffracted output beams, each containing s and p polarization components, are imaged on polarizing beam splitters 50a and 50b, one of the respective divided beam components being projected through respective test mediums 44$_{a1}$ and 44$_{a2}$, through a 45° Faraday rotators (power=45°) 51a, 51b, reflected by respective mirrors 52a and 52b back through the Faraday rotators 51a and 51b, the test mediums 44$_{a1}$ and 44$_{a2}$ and back into the beam splitters 50a and 50b. The beams reflected through the test mediums are then passed through respective polarizers at 45° to both s and p directions before impinging on CCD photo detectors 45a' and 45b'. The other of the respective divided beam components are reflected by additional respective mirrors 52c and 52d through respective quarter-wave plates 53a and 53b.

By these polarizing optical components at the output, each beam from the second AOM 42', one fixed, one scanning, can be used to simultaneously test different mediums 44$_{a1}$ and 44$_{a2}$ respectively using DC and double diffracted +1×−1 order fixed test beam and +1 and +1 collinear scanning test beams.

Yet Another Variation of the Third Exemplary Embodiment

FIG. 4(e) shows a variation of the third embodiment wherein the interferometer is set-up for reflective optical interferometry with high frequency (e.g., 120 MHz) IF outputs and large circular cross-section probe/test beams. One output set-up is using the scanned beams with a high speed large area 2-D detector array, while the other output set-up is using a fixed high speed point detector 45a" with beams that stay stationary even when the AOM frequency is changed to cause the scanning. Other aspects being the same as shown in FIG. 4(d), explanation of this variation will not be belabored.

A Further Variation of the Third Exemplary Embodiment

FIG. 4(f) shows an additional variation of the first embodiment wherein the interferometer is set-up for transmissive optical interferometry with high frequency IF outputs and a line scanning probe/test beam. The output set-up includes a fixed high speed point detector 45a for detecting collinear DC and double diffracted +1 order beams that stay stationary even when the AOD frequency $f_1$ is changed to effect scanning. The +1 and −1 order scanning beams are detected by a parallel distributed high speed sensor array 45c. A first cylindrical lens 43$_5$ is placed between a p-polarized laser source 46 and the first AOD 41 and a second cylindrical lens 43$_6$ is placed between the third spherical lens 43$_3$ and the photo detectors 45a and 45c. Without the two cylindrical lenses 43$_5$ and 43$_6$, the collimated input laser beam would give a scanning point beam on the sampling zone. Complex optical information can be read using the line scanned system if the fixed high speed point sensor 45a is replaced by a vertical (in paper) linear array of high speed point sensors. In this case, the last cylindrical lens 43$_6$ is removed. Thus, this embodiment converts the line scanner of FIGS. 4(a) and 4(b) into an optical point scanner. The high speed point sensor array 45c acts as a spatially distributed output signal feed that relays test material information for a particular line on the line scanning test zone that is sent to remotely independently or separated test signal processing test centers. For example, these remote locations (sites 1, 2 ... N) might be optically fed via low loss optical fibers that terminate in photodiodes.

An Additional Variation of the Third Exemplary Embodiment

Figure 4G:
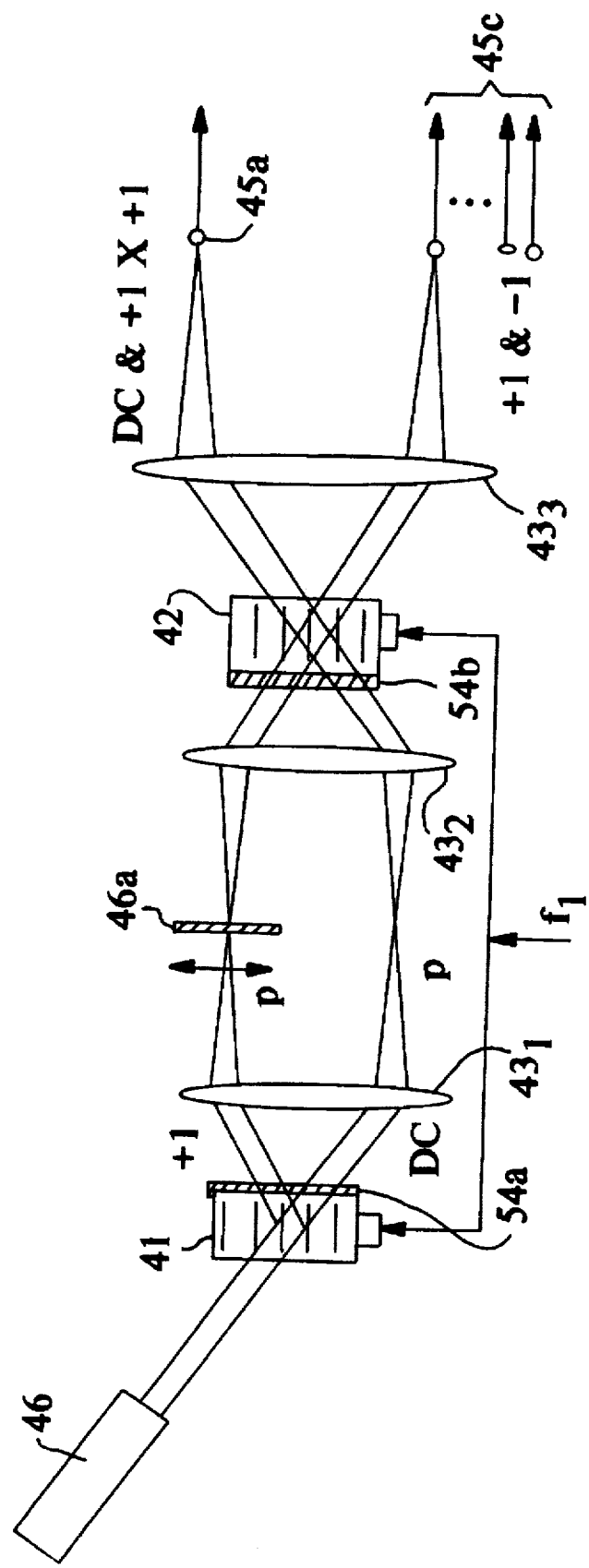
FIG. 4(g) shows a further transmissive interferometer which is set-up for IF outputs and a point scanning probe/test beam in accordance with a variation on the third embodiment of the present invention.

FIG. 4(g) shows a variation of the third embodiment wherein the interferometer set-up for transmissive optical interferometry with Intermediate Frequency (IF) outputs and a point scanning probe/test beam. It is similar to the second embodiment, but without the two cylindrical lenses. The output set-up is using a fixed high speed point detector 45a with beams that stay stationary even when the AOD frequency is changed to effect scanning. The collimated input laser beam from laser 46 gives a scanning point beam on a 2-D test zone 44a. 2-D amplitude/phase information can be read using the point scanned system using AODs 41 and 42 and Nematic Liquid Crystal (NLC) deflectors 54a and 54b, associated therewith which deflect the light in the y-direction for area scanning.

Fourth Exemplary Embodiment of the Invention

Figure 2B:
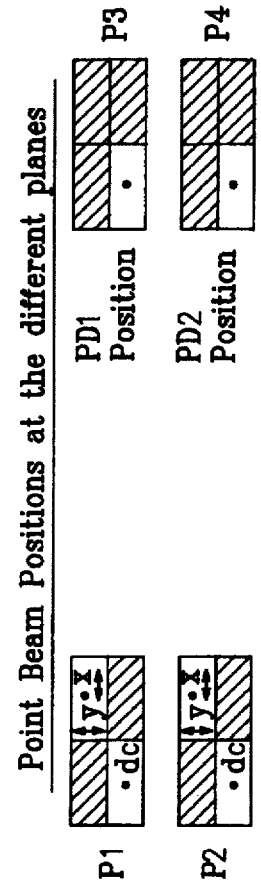
FIG. 2(b) shows point beam positions at different planes in the point scanning interferometer shown in FIG. 2(a)
Figure 7A:
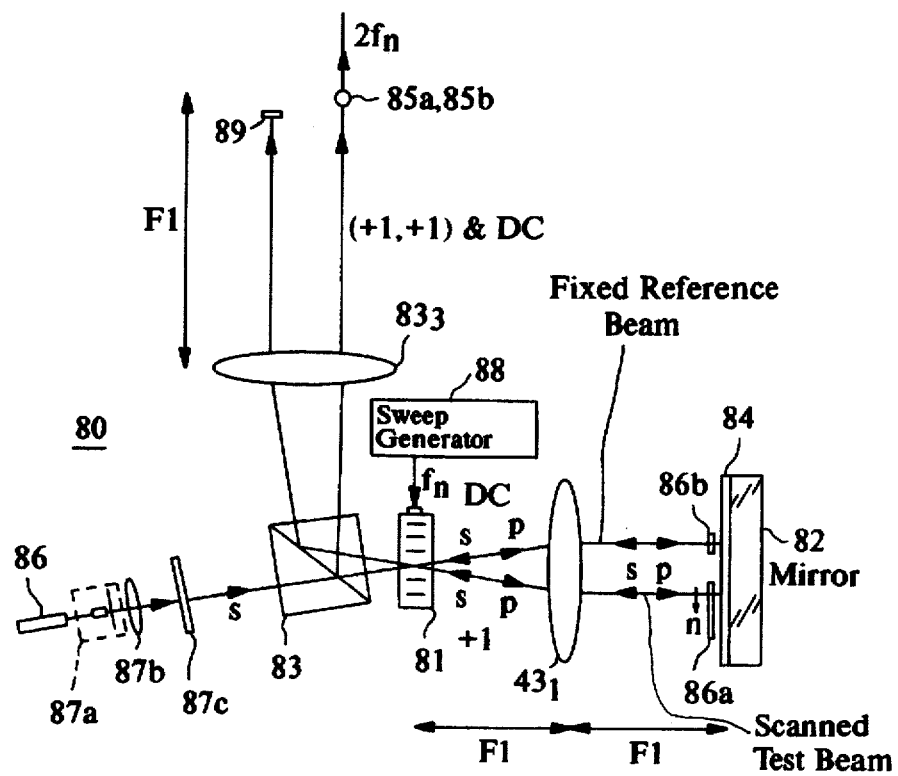
FIGS. 7(a) and 7(b), show a reflective, line scanning heterodyne optical interferometer for optical measurement and sensing applications of transmissive objects, in accordance with a fourth embodiment of the present invention; and 7(c) is a point scanning reflective interferometer sensor system.

In some application scenarios, it is beneficial to use a reflective geometry phase measurement set-up. One example which is similar to the first embodiment of FIGS. 2(a) and 2(b), is when instrument size and weight must be minimized, or when the test medium itself is naturally reflective in nature, such as in mirror surface characterization. Since the transmissive-mode scanning heterodyne interferometer 40 in FIGS. 4(a) and 4(b) is symmetric around the focal plane of lenses 43$_1$ and 43$_2$, it can be reduced in volume by the use of a mirror at the focal plane of the first lens 43$_1$, thus forming the reflective-mode scanning heterodyne optical interferometer 80 shown in FIGS. 7(a) and 7(b). Here, the mirror 82 actually folds the system and retraces the light beams through the only AOD 81 for the second Bragg diffraction; thus, on the reflected path, the single AOD 81 in FIGS. 7(a) and 7(b) also acts as the second AOD 42 in the transmissive case of FIGS. 4(a) and 4(b).

Appropriate polarization optics, such as a polarizing beam splitter (PBS) 83 are used in this design to direct the input p-polarized laser light (after passing through a spatial filter 87a, a collimating spherical lens 87b and a cylindrical lens 87c) into the optical system and the test medium 84a, and to deflect the reflected s-polarized light coming from the test medium 84a towards the high speed photo detectors 85a and 85b for heterodyne detection. A quarter wave plate (QWP) 84 with its axis at 45° with the incident p-polarization ensures that the light returning back through the AOD 81 to the PBS 83 is s-polarized and is therefore deflected by 90° by the PBS 83. The AOD 81 operates effectively for both p and s-polarized light. With current thin film fabrication technology, it is possible to have a QWP 84 deposited on a mirror surface 82, thus minimizing the number of independent optical components as each additional component is an additional phase noise source. A 45° rotation power Faraday rotator can also be used instead of the QWP 84 to give the instrument more robustness to component alignment accuracy and wavelength sensitivity. As in the transmissive scanning interferometer 40, the reflective scanning interferometer 80 operates on the same +1 order double Bragg diffraction principles of Bragg cells; in this case, the single Bragg cell AOD 81.

Figure 7B:
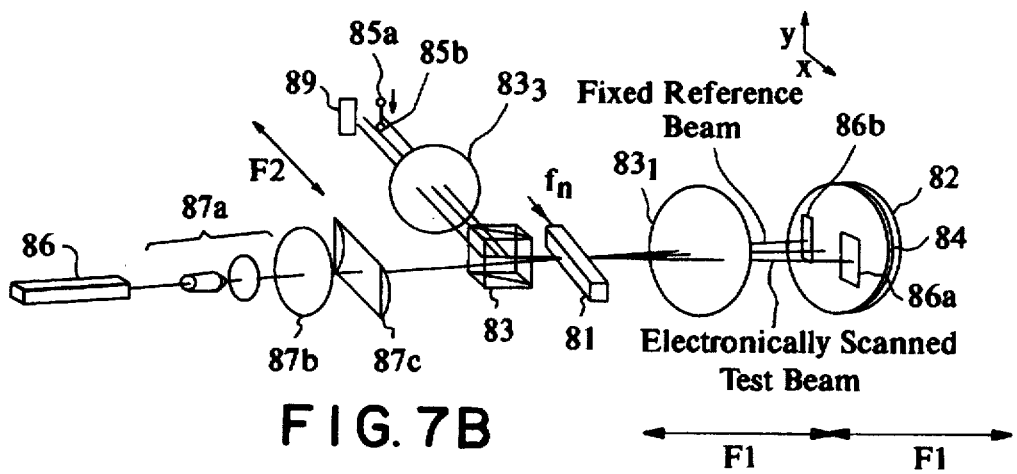

FIG. 7(b) shows a three dimensional view of the novel scanning optical interferometer 80 where one can see the physically separate high speed photo detectors 85a and 85b that are used for reference signal and scan signal generation, respectively, via heterodyne detection. The other scanning output beams are blocked by a spatial block 89.

Other aspects of the seventh embodiment being the same, description thereof will not be belabored here.

Figure 7C:
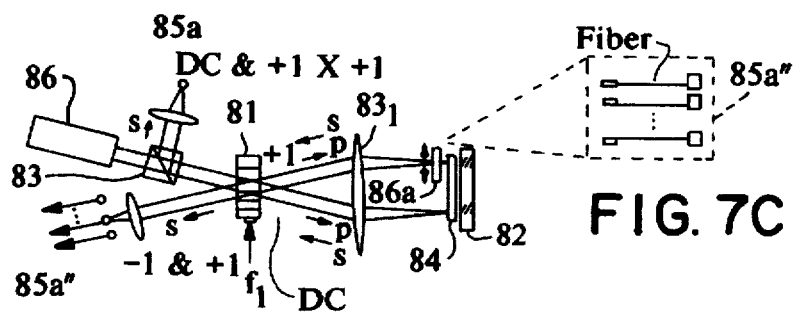

FIG. 7(c) shows a variation of the fourth embodiment wherein a single Bragg cell can be used to form a reflection-type heterodyne scanning optical interferometer. In this case, a point scans in 1-D, so a 1-D phase/amplitude test medium can be read. The scanning ability via Bragg cells and NLC devices 81 allows these systems to act as spatially distributed optical point sensors via the use of fiber-optic probes 85a", where the instrument can monitor any of the desired fiber-optic probes in a time-multiplexed fashion using just one point detector. The 1-D fiber-optic sensor array 85a" is optically connected to different remotely distributed sensing elements for, e.g., stress, temperature, etc. If simultaneous sensor detection is required, the same system can accomplish this using an array of point detectors 85a", as shown in FIG. 7(c). Also, the array of point detectors 85a" can be alternatively located in front of the Faraday rotator 84, rather than adjacent the laser light source.

Fifth Embodiment of the Present Invention

In the above descriptions, the interferometers detected phase and amplitude changes imparted by a test medium. The test medium can be anything, but may take the form of an optically encoded security or identification card, for instance. Specifically, the present invention can be employed as a high speed, wide bandwidth optical encryption system using spatial codes. More specifically, the present invention can be employed as a coherent wide bandwidth optical transmitter using fast optical scanning of spatial codes for encrypted coherent optical fiber transmission.

Certain applications such as identification (ID) verification and security clearance require several sophisticated electronic procedures for high performance implementation. These steps include direct reading of input user codes, processing and encoding for secure communication, communication over a secure channel, detection and decoding of user information, and verification for access or alarm/warning notification. Recently, the use of optical technology has become prominent in security and counterfeit measure systems, and there are perhaps three key reasons for this trend. First, it is very difficult to replicate/counterfeit two dimensional (2-D) optical spatial codes such as the holograms now commonly used on bank and credit cards. Because of the short wavelength of light, very tiny features/codes (a few micron size) can be recorded on user ID cards that are critical for the verification process. If these tiny features are not produced exactly (both in optical phase and amplitude), the verification process detects these faults, thus making optical codes a very useful security measure.

Second, optics also provides a very secure means of information transmission/reception. In particular, the use of coded coherent fiber communications is an extremely effective way to send electromagnetic interference (EMI) free signals that are not easily detectable as (a) the optical signal stays trapped in the fiber cable; unlike radio waves that can be detected by external radio receivers, (b) the fiber cable is physically small in size and flexible and therefore hard to physically detect, and (c) the fiber cannot easily be tapped without effecting the optical signal quality, and (d) most importantly, the coherent optical communication channel provides an extremely wide temporal bandwidth to coherently hide/code the information signals, implying that very wide bandwidth sophisticated coherent transmitters and coherent decoders and receivers are required for successfully implementing or duplicating the ID verification and security clearance process.

For security systems that use optical technology, users are issued 2-D spatially coded ID cards. In most cases, the ID cards carry one dimensional (1-D) bar codes that are read by a mechanically scanned laser beam. In some cases, the user mechanically scans the ID card along an insertion slot. In both cases, the detected laser beam appears as an intensity modulated light beam on a photo sensor that converts the intensity modulation to an electrical signal that is transmitted via an electrical cable to a central computer that decodes the information and implements the verification process. Thus, the only feature of optics used by these types of security systems is in the complex nature of the optical codes on the ID cards. Because of the mechanical scanning nature of these systems, the code generation process is slow; in addition, several photo sensors may be required to efficiently read all the coded information during scanning.

The present invention introduces coherent optical encryption and decryption systems that use several features of optical technology to provide highly secure ID verification. In particular, these systems use high speed electronically controlled optical scanning of ID cards and coherent coding/decoding for a coherent optical communication fiber link. The optical transmitter is a coherent interferometric system that includes the scanning system and the transmit/receive coherent coding/decoding fiber-optics with only one fiber input/output port. In short, these systems are very sensitive to unwanted external tampering.

Figure 8:
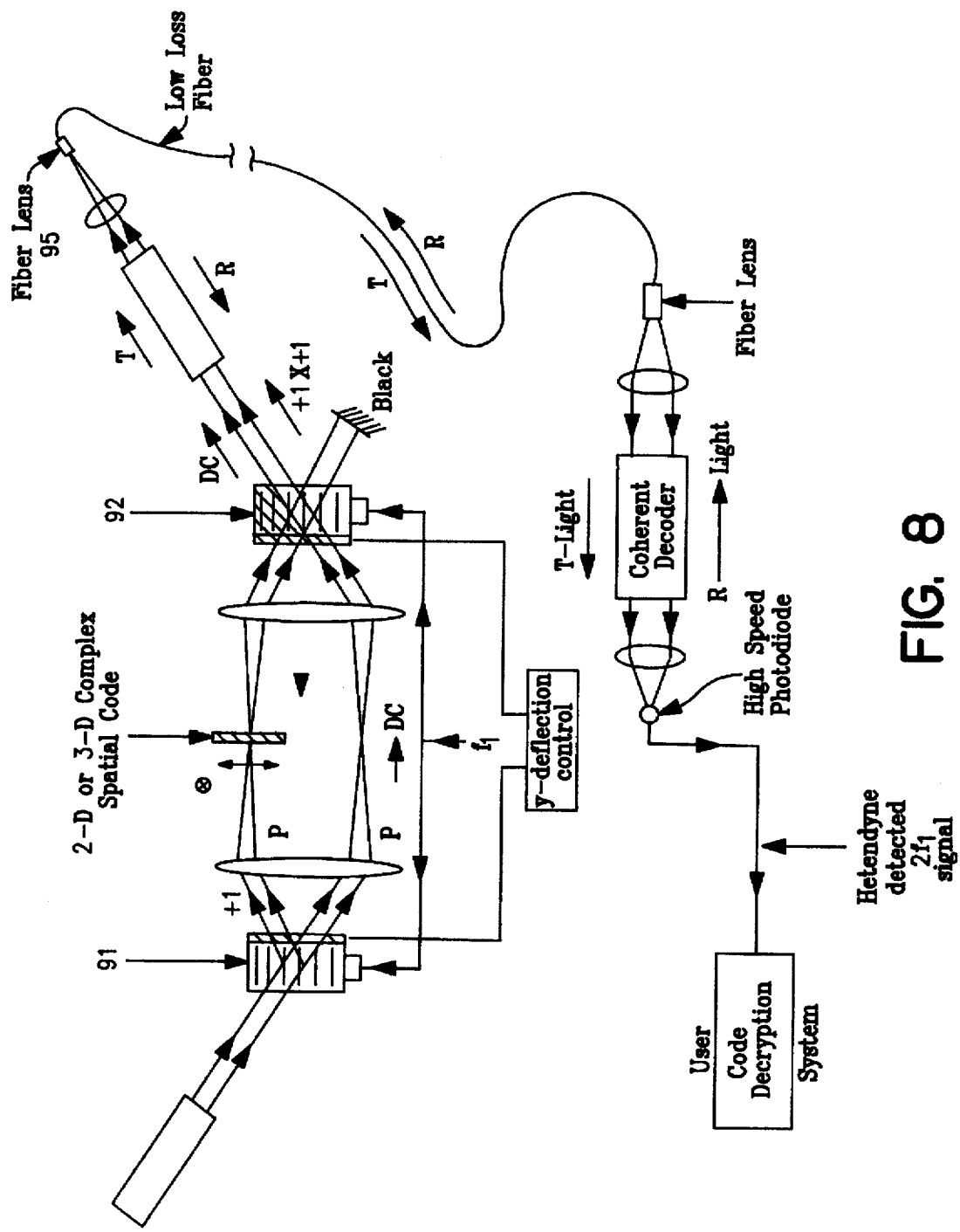
FIG. 8 shows a coherent option encoding system.

FIG. 8 shows a typical coherent optical encoding system that is essentially similar to FIG. 4(g), except for the coherent fiber optic link. The x-y scanning Doppler beam reads the complex user code and is then Bragg matched to a second Bragg cell or AOD 92. A majority of the DC light beam from a first AOD 91 essentially travels through the second AOD 92 to enter the coherent optical encoder (e.g., such as a delay line encoder or a grating/dispersion based device), and then is focussed as a tight spot into fiber coupling optics 95.

The +1 order beam from the first AOD 91 is diffracted as a +1 order positive Doppler shifted beam by the second AOD 92 through imaging optics $93_1$, $93_2$ that is fed by the same up-chirp signal of frequency $f_1+n\delta f$ that is fed to the first AOD 91. Thus, the net Doppler shift of this second AOD 92 diffraction with respect to the DC beam is $(f_1+n\delta f)+(f_1+n\delta f)=2(f_1+n\delta f)$. The DC beam and the user code modulated Doppler beam remain collinear during the code scanning process, regardless of the AOD and y-deflector drive frequency variation, and thus are simultaneously coupled into the coherent encoder and DC beam position fixed fiber used for communicating the coherently encoded information. The system is unique in-line Bragg interaction geometry plus the fact that both Bragg cells are fed by the same drive signal makes the doubly diffracted beam always collinear with the stationary DC beam. The DC beam acts as a reference signal; thus this optical assembly also acts as a coherent interferometric fiber-optic transmitter for frequency shift-keyed (FSK) modulation. The remote low loss coherent fiber delivers both the coded signal beam and the DC reference beam to a coherent decoder and a high speed photodiode for heterodyne detection. The single broadband high speed photo diode generates a broadband coded signal of frequency $2(f1+n\delta f)$ via optical heterodyne detection. The bandwidth of this signal is $2N \delta f$.

After user code decryption processing, the verification signal can be transmitted to the user site encoder location via the same optical fiber used for code transmission, but on a different color optical carrier (not shown). Thus, by using dichroic optics, essentially the same fiber-optic hardware can be used for both transmit and receive modes, making a compact assembly. The broadband coherent communications nature of the code transmission signal makes it hard to detect and process, much like a spread-spectrum signal in coherent electronic communications. The actual value of the signal bandwidth depends on the type of Bragg cell used in the encoder. There are two main types of Bragg cells that can be used for these systems. For rf cells, f1 can be 50 MHz with $\delta f=100$ KHz and N=400. In this case, the broadband signal varies from 100 KHz to 40 MHz with a duration of 4 ms per period. For microwave cells, f1 can be 1 GHz with $\delta f=1$ MHz and N=1000. In this case, the broadband signal varies from 1 MHz to 1 GHz with a duration of 1 ms per period. Thus, broad bandwidths in the GHz regime can be generated for the encoded signals.

The encoder described herein can be used for processing user codes with various types of modulation. This includes optical phase and amplitude modulation, polarization rotation via optical birefringence, and polarization perturbations via magnetic film effects. The scanning described in the encoder can be limited to one direction, or as shown in FIG. 8, is also possible to use optical beam scanning in the other orthogonal direction (y') by using a programmable y-beam deflector on the input laser beam as in the second embodiment. Typically, this deflector can be a liquid crystal deflector or a bulk electro-optic deflector. Because the fast scan along x' is handled by the first AOD 91, these y' deflectors do not have to be very high speed with 1 ms response times adequate. Note that programmable 2-D codes can be directly used in the encoder if a spatial light modulator is positioned at the ID card insertion slot.

Benefits of the Novel Scanning Interferometers

Important system benefits related to the novel interferometers include the accuracy of the optical phase measurement that depends on several optical and electronic component signal processing characteristics plus the instrument optical and electrical assembly. Both the reference and scan signals generated by the photo detectors will have very similar phase noise characteristics because of the almost common-path optical architecture of the interferometer. This can prove very helpful in reducing the phase noise in the processed phase-detector output signal as the phasemeter via electronic mixing of the scan and reference signals implements an electronic phase noise cancellation circuit.

Other benefits include that control phase measurement accuracy is dependant on the standard electronic noise properties of the phase measuring optoelectronics and electronics such as photo diodes, amplifiers, rf cables, power supplies, and low pass filter, which have been previously dealt with in detail in R. Dändliker, *Progress in Optics*, North Holland, Amsterdam, 17, 1 (1980).

Mechanical and vibrational stability is another issue that deserves attention as it is also linked to output signal phase noise and thus phase measurement accuracy. In an instrument in accordance with the present invention, because of the small number of optical components (e.g., four) that make the basic in-line interferometer 20, plus the almost common-path in-line design where both signal and reference optical beams travel in close proximity between the Bragg cells (in the transmissive design 20) or Bragg cell and mirror (in the reflective design 30), these beams suffer similar phase perturbations that are cancelled out on heterodyne detection at the photo receiver 25a. In other words, the phase noise in the interfering beams at the output plane is correlated, and the coherent heterodyne detection process at the photo-detector cancels this noise. This contributes to a robust mechanical and optical design that has both resistance to vibrations and other environmental effects.

Furthermore, because of the almost common-path optical design, a high coherence length, narrow spectral linewidth (e.g., 10 KHz) laser is not required, and the heterodyne detected output rf signal spectral linewidths are not altered by the laser linewidth. Thus, high CW or peak power lasers, which typically have broad (>10 MHz) spectral line widths, can be used with the inventive scanning interferometer. Furthermore, because of the bulk-optics nature of the optical components used in the interferometer, a higher optical power damage threshold is possible, which means the interferometer is capable of use with very high power (e.g., CW 10 W) lasers for applications where high optical power is necessary, such as, combustion, shock wave, and turbulence experiments.

Another instrument design issue that controls the output rf signal noise characteristics is the quality of the Bragg cell drive rf signals. A Bragg cell drive signal with poor amplitude and phase noise values will propagate this noise through the optical instrument, and will result in a similarly poor amplitude and phase noise output rf signal from the photo detectors. Thus, a high quality rf sweep generator with low noise figure power amplifiers must be used to drive the Bragg cells. For the experiment discussed above, the power amplifiers 45c and 45d had specified 10 dB typical noise figures (NFs), while the sweep generator 28, a Wavetek Model 5135A signal synthesizer, had −125 dBc/Hz at +100 KHz and −135 dBc/Hz at +100 KHz specified amplitude and phase noise values, respectively. From the experimental interferometer, −108.9 dBc/Hz and −101.57 dBc/Hz amplitude and phase noise values, respectively, were measured at +160 Khz offsets. The measured instrument noise numbers −108.9 dBc/Hz (amplitude) and −10 1.57 dBc/Hz (phase) and are very similar to the original rf signal noise numbers of −115 dBc/Hz (amplitude) and −105 dBc/Hz (phase) available from the instrument external signal processing electronics, after giving consideration to the 20 dB noise addition via the two 10 dB NF power amplifiers in the signal processing chain (i.e., amplifier at AOD drive input and amplifier after photo detection). Thus, within photo detection shot noise limits, high quality Bragg cell rf drive signals will generate high C/N rf output signals from the instrument, improvements in instrument phase measurement accuracy are achieved.

Another system issue is the overall instrument optical efficiency, as this controls the type of laser required for a particular application. Optical power efficiency of the inventive instrument $\eta s$ is approximately given by:

$$n_s = [\eta_1\eta_2 + (1-\eta_1)(1-\eta_2)], \quad (6)$$

where $\eta_1$ and $\eta_2$ are the first order Bragg diffraction efficiencies for first and second AODs, respectively. In the experiment discussed above, the first order Bragg diffraction efficiencies were measured to be $\eta_1=\eta_2=0.4$ (or 40%), giving an overall instrument efficiency of 0.52 or 52%. Because the experiment involved the use of a 100 mW CW laser, and a 10 times reduction neutral density filter at the output plane, a total of ~5.2 mW of optical power should be available for high speed photo detection. In the experimental case, because all the components had no anti-reflection (AR) coatings, a slightly lower optical power was measured. Thus, depending on the application, a low power (e.g., 10 mW) laser can also be used in an interferometer in accordance with the present invention. As discussed briefly above, the modulation depth of the output rf signals from the photo detectors is related to the Bragg diffraction efficiencies and hence the optical powers $P_{DC}$ and $P_{scan}$ of the reference (DC) and scan signal (+1 X −1) optical beams, respectively. This modulation depth of the heterodyne detected output rf signals can be approximately expressed as:

$$m_d = s\sqrt{P_{DC} \times P_{scan}}/[P_{DC}+P_{scan}] \quad (7)$$
$$= \frac{2\sqrt{(1-\eta_1)(1-\eta_2)\times\eta_1\eta_2}}{(1-\eta_1)(1-\eta_2)+\eta_1\eta_2}.$$

In the experiment, the first order Bragg diffraction efficiencies were measured to be $\eta_1=\eta_2=0.4$ (or 40%). In this case, using equation 7, it would be expected the desired output modulation depth of $m_d=0.923$. The experimental value was approximately $m_d=0.9$. The ideal modulation depth for high efficiency heterodyne detection is $m_d=1.0$, and occurs when $\eta_1=\eta_2=0.5$ (or 50%).

Unlike Bragg cell based rf linear signal processing applications where Bragg cells need to be operated at low diffraction efficiencies of <10% to maintain linear rf-to-optical modulation of the input rf signals to generate high spurious-free two-tone dynamic range output signals, the present invention does not require low diffraction efficiency linear-mode Bragg cell operation. Because only single tone pure sinusoidal signals are fed to the Bragg cells at any given time in the instrument, no non-linear inter-modulation product terms within the operational Bragg cell bandwidth (or device passband) are produced via the non-linear high diffraction efficiency Bragg cell operation. Thus, an interferometer in accordance with the present invention allows high diffraction efficiency (e.g., $\eta_1=\eta_2=0.5$) Bragg cell operation that results in a maximum $\eta_2=0.5$ or 50% over all optical power efficiency for the system.

There are several types of commercial Bragg cells that can be used with the inventive scanning interferometer. The key differences in the devices are in the rf frequency of operation, AO interaction material, piezoelectric transducer size, and the time bandwidth product (i.e., device bandwidth multiplied by device time aperture) or storage capacity of the device. Most commercial AODs are either rf band (i.e., <100 MHz center frequency) devices, or microwave band (i.e., <2 GHz center frequency) wideband devices. For example, Tellurium Dioxide and flint glass are typical materials used in rf-band devices, while Gallium Phosphide (GaP) and Lithium Niobate are typical materials used in microwave-band devices. Typically, Bragg cells have time bandwidth products that range from a 400 to 1000 cycles, implying that a high quality AO beam deflector can deflect an input laser beam through a maximum of 1000 scan points. For the interferometer application, this means that the instrument can rapidly scan a 1000 independent points along the x-direction on the test material. The point scan rate R depends on the AOD time aperture T, and is approximately given by R=1/T, where in this case, the frequency of the AOD drive is changed every T seconds, with the frequency step rate being 1/T. These are ideal scan conditions, and various scan system tradeoffs will have to be made based on laser beam illumination profiles, optical component apertures, switching speed of AOD drive signal generation electronics, and lens focal lengths.

The active distance $D_x$ the laser beam scans along the x-direction using AOD 21 is approximately given by the expression:

$$D_x = \{\Theta_{stop} - \Theta_{start}\} \cdot Fl \quad (8)$$

where $$\Theta_{stop}(milli\text{-}radians) = \{\lambda(\mu m) \times f_{stop}(MHz)\}/\{v_a (mm/\mu s)\},$$

and $$\Theta_{start}(milli\text{-}radians) = \{(\lambda(\mu m) \times f_{start}(MHz)\}/\{v_a (mm/\mu s)\}. \quad (9)$$

Here the start and stop subscripts correspond to the optical scan start and stop positions and respective AOD drive frequencies. In the experiment discussed above using flint glass AODs with a 40 MHz bandwidth centered at 70 MHz, Fl=15 cm, and using $f_{start}$=50 MHz and $f_{stop}$=90 MHz, a total scan length of $D_x$=830 μm along the x-direction is achieved with the experimental interferometer 20.

The Rayleigh resolution optical spot size diameter at the scan plane is approximately given by:

$$\delta x\ (\mu m) = \{2.44\lambda(\mu m) \times Fl(mm)\}/\{D_a(mm)\}, \quad (10)$$

where $D_a$ is the active optical beam diameter at the entrance of first lens $23_1$. In experimental case, $D_a$~1 cm, thus giving us a beam spot size (along the x-direction) at the scan plane of ~19.5 μm. In the experiment, a vertical optical line scanning along the x-direction was employed. Based on these design numbers, the experimental interferometer can scan a total of $D_x/\delta x$~42 spots along the test material. Improvements in both number of scan points and the area scanned can be made by careful design of the beam focusing optics, and by choosing the optimum AOD. For instance, if a GaP AOD was used, such as the one available from Brimrose Corp., Baltimore, Md., that has a $v_a$=6.3 mm/μs and a bandwidth of 1 GHz, using the same optical set-up (i.e., same Fl and λ), a much larger length of $D_x$=12.67 mm can be scanned. Thus, depending on the instrument design, both small (<100 μm×100 μm) or moderately large (e.g., 1.5 cm×1.5 cm) regions of a test medium can be scanned using the inventive interferometer.

The test medium phase map reconstruction method used with the inventive interferometer can be similar to the two fiber sampling point scan method described for earlier heterodyne holography systems, such as disclosed in R. D āndliker, *Progress in Optics*, North Holland, Amsterdam, 17,1 (1980), cited above. Previously, the two fiber scan method for interferogram reconstruction involved two fiber local sampling of the image plane, where one fiber at the interference plane can be stationary, i.e., the reference point, while the other fiber mechanically scans the moving fringe pattern on the interference plane to generate the phase data. The useful information for phase map reconstruction obtained by this method includes the number of fringes crossed during the scan process and the interpolation value of the phase within one fringe.

In the inventive scanning interferometer a similar data collection and reconstruction process can be implemented, where here, instead of mechanically moving detectors, an electronically scanned optical beam is employed to simulate the motion of the moving fiber/detector. Like the two fiber scan method, a fixed detector that provides the reference phase information for later interpolation is still used. In this case, by electronically scanning the read laser beam over the test medium, a moving fringe pattern is simulated at the output interference plane where the two sampling detectors are placed.

The present invention has been disclosed by way of exemplary embodiments. Other variations of this basic design are also possible, including high speed 2-D optical scanning systems. Also, the Zeeman effect laser can be used as a laser source in the above embodiments. This allows the simple performance of differential mode or two point interferometry. Further variations will suggest themselves to skilled artisans which fall within the spirit and scope of the invention, which is to be determined by the claims appended hereto.

I claim:

1. A reflective optical interferometric scanner comprising
means for supplying coherent light;
means for splitting said coherent light into a first beam and a second beam;
a first acousto-optical device having a first channel for selectively deflecting a first portion of said first beam in accordance with a first frequency in a first direction and a second channel for selectively deflecting a first portion of said second beam in accordance with a second frequency in first direction wherein the difference between the first and second frequencies is fixed and a second portion of said first and second beams are not deflected by said first acousto-optical device;
a second acousto-optical device for deflecting a test beam, said test beam being part of said first portion of said first beam, and a reference beam, said reference beam being part of said second portion of said second beam, in a second direction substantially perpendicular to said first direction;
a test medium an area through which said test beam passes in a two dimensional scanning pattern;
a reflective element which is positioned to reflect said test beam and said reference beam back through said first and said second acousto-optic devices;
detector means for detecting said test beam and for detecting said reference beam; and
signal processing means for generating an intermediate frequency signal from said test and reference beams, said intermediate frequency signal bearing phase and amplitude information of said test medium.

2. A reflective optical interferometer scanner in accordance with claim 1, further comprising a polarizing beam splitter to separate said reflected test beam and reference beam from said first beam and said second beam, respectively.

3. A reflective optical interferometer according to claim 1, further comprising a calibration plate in a light path of said reference beam.

4. A reflective optical interferometer according to claim 1, further comprising imaging optics between said second acousto-optic device and said reflective element.

5. A reflective optical interferometer according to claim 2, further comprising imaging optics between said polarizing beam splitter and said detecting means.

6. A reflective optical interferometer according to claim 1, wherein said detecting means includes two point detectors, one detecting said reflected test beam and the other detecting said reflected reference beam.

7. A reflective optical interferometer according to claim 6, wherein said point detectors are fixed at a given location.

8. A scanning spot heterodyne optical interferometer comprising:
means for providing a first coherent light beam and a second coherent light beam having a frequency different from said first coherent light beam;
light combining means for combining said first and said second light beams into a collinear beam composed of two wavelengths;
first means for splitting said collinear light beam into fixed beams unaffected by said first means and test beams varying in spatial position in a first direction in accordance with a signal input to said first means and producing a frequency shift in said test beams relative to the fixed beams;
a first light deflector for deflecting said fixed and test beams in a second direction perpendicular to said first direction;
a test medium onto which said test beams impinge as they vary in spatial position in said first and said second directions perpendicular to an optical axis of said interferometer, said test medium imparting a further frequency shift onto said test beams;
second means for recombining said fixed beams and said test beams from said first means and providing said test beams with a further frequency shift relative to said fixed beams, wherein said fixed beams and said test beams are collinear and unmoving in at least said first direction; and
means for detecting test medium phase information from said test beam.

9. A scanning spot heterodyne optical interferometer according to claim 8, wherein said means for providing said first and second coherent light beams includes two separate lasers, one of which is frequency tunable.

10. A scanning spot heterodyne optical interferometer according to claim 8, wherein said beam combining means is a dichroic beam splitter.

11. A scanning spot heterodyne optical interferometer according to claim 8, wherein said first beam splitting means includes an acousto-optic device.

12. A scanning spot heterodyne optical interferometer according to claim 8, wherein said first light deflector includes a programmable grating.

13. A scanning spot heterodyne optical interferometer according to claim 8, wherein said second means for recombining includes a second light deflector for deflecting said fixed and test beams in said second direction and an acousto-optic device.

14. A scanning spot heterodyne optical interferometer according to claim 8, wherein said detecting means includes a second dichroic beam splitter separating said first and said second coherent beams, and a first and a second photodetector for respectively detecting double defracted light beam components of said first and said second coherent beams.

15. A scanning heterodyne optical interferometer comprising:

means for providing a coherent light beam;

first means for splitting said coherent light beam into a fixed beam unaffected by said first means and a test beam varying in spatial position in accordance with a signal input to said first means and producing a frequency shift in said test beam relative to the fixed beam;

a test medium onto which a first part of said test beam impinges as it varies in spatial position in a first direction perpendicular to an optical axis of said interferometer, said test medium imparting a further frequency shift onto said first part of said test beam but not a second part of said test beam;

second means for recombining said fixed beam from said first means and said test beam and providing said test beam with a further frequency shift relative to said fixed beam, wherein said fixed beam and said test beam are collinear and unmoving in at least said first direction; and means for detecting test medium phase information from said first and second parts of said test beam.

16. A scanning heterodyne optical interferometer according to claim 15, wherein said first and second means are acousto-optic devices.

17. A scanning heterodyne optical interferometer according to claim 15, wherein said first and second means are Bragg cells.

18. A scanning heterodyne optical interferometer according to claim 15, wherein said first and second means are driven by identical frequencies.

19. A scanning heterodyne optical interferometer according to claim 15, wherein, after being recombined with said fixed beam, said second part of said test beam is used as a reference to determine phase shift of said first part of said scanning beam.

20. A scanning heterodyne optical interferometer according to claim 15, further comprising 1:1 optics between said first and second means, said test medium being interposed therebetween.

21. A scanning heterodyne optical interferometer according to claim 15, wherein said detecting means is a point detector.

22. A scanning heterodyne optical interferometer according to claim 15, wherein said detecting means is a detector array.

23. A scanning heterodyne optical interferometer according to claim 15, further comprising first and second deflectors associated with said first and second means, respectively, for deflecting said fixed and said test beams in a second direction substantially perpendicular to said first direction.

24. A scanning heterodyne optical interferometer according to claim 15, wherein said second means splits off a portion of said fixed beam unaffected by said first means into a first scanning beam and frequency shifted by said test material and wherein said second means splits of a portion of said test beam, said portions of said fixed beam and said test beam forming a second output beam which is collinear and moving in said first direction, said second output beam being detected by a high speed sensor array.

25. A scanning heterodyne optical interferometer comprising:

means for providing a coherent light beam;

first means for splitting said coherent light beam into a fixed beam unaffected by said first means and a first scanning beam shifting in spatial position and frequency;

second means for splitting said first fixed beam into a second fixed beam unaffected by either first or second means and a second scanning beam shifting in spatial position and frequency, and for splitting said first scanning beam into a third scanning beam shifting in spatial position and a third fixed beam unaffected by said second means, said second and third fixed beams being collinear and said second and third scanning beams being collinear;

first and second polarizing beam splitters for splitting polarized light components of said collinear second and third fixed beams and said second and third scanning beams, components of each passing through a test medium and the other components of which acts as a reference; and detecting means for determining phase differences between respective components.

26. A scanning heterodyne optical interferometer according to claim 25, wherein said detecting means is a pair of CCD detectors.

27. A scanning heterodyne optical interferometer according to claim 25, wherein said detecting means includes a 2-D array for detecting said a phase difference in said second and third scanning beams.

28. A scanning heterodyne optical interferometer according to claim 25, wherein said detecting means includes point detector for detecting a phase difference in said second and third fixed beams.

* * * * *